(12) United States Patent
Gatta et al.

(10) Patent No.: US 9,736,050 B2
(45) Date of Patent: Aug. 15, 2017

(54) KEEP ALIVE MANAGEMENT

(71) Applicant: MICROSOFT TECHNOLOGY LICENSING, LLC, Redmond, WA (US)

(72) Inventors: Srinivas Raghu Gatta, Redmond, WA (US); Kamalavasan Srinivasan, Redmond, WA (US); Osman N. Ertugay, Bellevue, WA (US); David G. Thaler, Redmond, WA (US); Dmitry A. Anipko, Seattle, WA (US); Jeroen Vanturennout, Snohomish, WA (US); Mohammad Saifur Rahman, Redmond, WA (US); Poornananda R. Gaddehosur, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/217,490

(22) Filed: Jul. 22, 2016

(65) Prior Publication Data
US 2016/0330098 A1 Nov. 10, 2016

Related U.S. Application Data

(63) Continuation of application No. 14/526,391, filed on Oct. 28, 2014, now Pat. No. 9,544,213, which is a
(Continued)

(51) Int. Cl.
*H04L 12/26* (2006.01)
*H04L 12/12* (2006.01)
(Continued)

(52) U.S. Cl.
CPC ........ *H04L 43/0876* (2013.01); *G06F 1/3206* (2013.01); *G06F 1/3234* (2013.01);
(Continued)

(58) Field of Classification Search
CPC .................................................. H04L 67/145
(Continued)

(56) References Cited

U.S. PATENT DOCUMENTS

| 4,635,187 A | 1/1987 | Baron et al. |
| 6,212,175 B1 | 4/2001 | Harsch |

(Continued)

FOREIGN PATENT DOCUMENTS

| CN | 1519680 | 8/2004 |
| CN | 101449597 | 6/2009 |

(Continued)

OTHER PUBLICATIONS

"Non-Final Office Action Issued in U.S Appl. No. 12/480,560", Mailed Date: Mar. 19, 2012, 14 Pages.
(Continued)

*Primary Examiner* — Lashonda Jacobs
(74) *Attorney, Agent, or Firm* — Workman Nydegger

(57) ABSTRACT

Keep alive management techniques are described. In one or more implementations, a keep alive interval is calculated by an operating system of the computing device. The keep alive interval is used to maintain one or more notification channels between one or more applications of the computing device and a network.

20 Claims, 20 Drawing Sheets

US 9,736,050 B2

Page 2

Related U.S. Application Data continuation of application No. 13/229,325, filed on Sep. 9, 2011, now Pat. No. 8,892,710.

(51) Int. Cl.
- G06F 1/32 (2006.01)
- H04L 29/08 (2006.01)
- H04W 52/02 (2009.01)

(52) U.S. Cl.
CPC ............ *G06F 1/3287* (2013.01); *H04L 12/12* (2013.01); *H04L 43/04* (2013.01); *H04L 67/145* (2013.01); *H04W 52/0209* (2013.01); *Y02B 60/32* (2013.01); *Y02B 60/34* (2013.01); *Y02B 60/50* (2013.01)

(58) Field of Classification Search
USPC ................. 709/223, 224, 229; 370/252, 401
See application file for complete search history.

(56) References Cited

U.S. PATENT DOCUMENTS

| | | | |
|---|---|---|---|
| 6,640,268 B1 | 10/2003 | Kumar | |
| 6,904,519 B2 | 6/2005 | Anand et al. | |
| 6,938,040 B2 | 8/2005 | Allison et al. | |
| 6,943,667 B1* | 9/2005 | Kammer ............... G06F 1/3203 | |
| | | | 340/286.01 |
| 6,976,071 B1 | 12/2005 | Donzis et al. | |
| 7,120,688 B1 | 10/2006 | Nguyen et al. | |
| 7,152,111 B2 | 12/2006 | Allred et al. | |
| 7,213,063 B2 | 5/2007 | Bressoud et al. | |
| 7,236,781 B2 | 6/2007 | Patil et al. | |
| 7,274,929 B1 | 9/2007 | Banginwar | |
| 7,426,569 B2 | 9/2008 | Dunk | |
| 7,460,556 B2 | 12/2008 | Duggirala et al. | |
| 7,562,147 B1 | 7/2009 | Cohen | |
| 7,568,040 B2 | 7/2009 | Townsley | |
| 7,584,274 B2 | 9/2009 | Bond et al. | |
| 7,610,388 B2 | 10/2009 | Yamamoto | |
| 7,668,100 B2 | 2/2010 | Balasaygun | |
| 7,672,264 B2 | 3/2010 | Babin | |
| 7,675,916 B2 | 3/2010 | Kempe | |
| 7,693,084 B2 | 4/2010 | Herzog | |
| 7,693,146 B2 | 4/2010 | Subramanian | |
| 7,729,273 B2 | 6/2010 | Knapik et al. | |
| 7,729,357 B2 | 6/2010 | Strater et al. | |
| 7,756,155 B2 | 7/2010 | Duggirala et al. | |
| 7,778,623 B2 | 8/2010 | Araki et al. | |
| 7,779,451 B2 | 8/2010 | Eldar | |
| 7,809,386 B2 | 10/2010 | Stirbu | |
| 7,843,915 B2 | 11/2010 | Kashyap | |
| 7,899,921 B2 | 3/2011 | Hill | |
| 7,936,708 B2 | 5/2011 | Kesavan et al. | |
| 7,965,637 B1 | 6/2011 | Trivedi et al. | |
| 7,978,630 B2 | 7/2011 | Bengtsson et al. | |
| 8,050,207 B2 | 11/2011 | Zhao et al. | |
| 8,065,419 B2 | 11/2011 | Vimpari et al. | |
| 8,073,964 B2 | 12/2011 | Dunk | |
| 8,194,636 B1 | 6/2012 | Doherty et al. | |
| 8,239,698 B2 | 8/2012 | Maciocco et al. | |
| 8,307,234 B2 | 11/2012 | Gobriel et al. | |
| 8,331,274 B2 | 12/2012 | Kee | |
| 8,375,134 B2 | 2/2013 | Herzog | |
| 8,402,289 B2 | 3/2013 | Maciocco et al. | |
| 8,566,625 B2 | 10/2013 | Gobriel et al. | |
| 8,621,494 B2 | 12/2013 | Singh et al. | |
| 8,635,630 B2 | 1/2014 | Iyer | |
| 8,706,855 B2 | 4/2014 | Masputra et al. | |
| 8,806,250 B2 | 8/2014 | Gatta et al. | |
| 8,892,710 B2* | 11/2014 | Gatta ..................... H04L 12/12 | |
| | | | 709/223 |
| 8,917,742 B2 | 12/2014 | Ertugay et al. | |
| 9,049,660 B2 | 6/2015 | Thaler et al. | |
| 9,155,038 B2* | 10/2015 | Choi .................. H04W 52/0206 | |
| 9,277,500 B1* | 3/2016 | Solsona-Palomar ... H04W 52/0229 | |
| 9,294,379 B2 | 3/2016 | Thaler et al. | |
| 9,544,213 B2* | 1/2017 | Gatta ...................... H04L 12/12 | |
| 2003/0128676 A1 | 7/2003 | Lee | |
| 2003/0210658 A1 | 11/2003 | Hernandez et al. | |
| 2004/0205781 A1 | 10/2004 | Hill et al. | |
| 2005/0050197 A1 | 3/2005 | Boyd et al. | |
| 2005/0198257 A1 | 9/2005 | Gupta | |
| 2006/0107081 A1 | 5/2006 | Krantz et al. | |
| 2006/0123119 A1 | 6/2006 | Hill | |
| 2006/0128349 A1 | 6/2006 | Yoon | |
| 2006/0162682 A1 | 7/2006 | Kondo et al. | |
| 2006/0184813 A1* | 8/2006 | Bui ........................ H04L 12/12 | |
| | | | 713/320 |
| 2006/0242328 A1 | 10/2006 | Guo et al. | |
| 2006/0252449 A1* | 11/2006 | Ramesh ................ H04W 52/44 | |
| | | | 455/522 |
| 2006/0291580 A1 | 12/2006 | Horvitz | |
| 2007/0013816 A1* | 1/2007 | Martin ................... H04N 5/782 | |
| | | | 348/730 |
| 2007/0082714 A1 | 4/2007 | Beach et al. | |
| 2007/0112954 A1 | 5/2007 | ramani et al. | |
| 2007/0140159 A1 | 6/2007 | Eronen et al. | |
| 2007/0140193 A1 | 6/2007 | Dosa et al. | |
| 2007/0140263 A1 | 6/2007 | Mitome et al. | |
| 2007/0214256 A1 | 9/2007 | Castaneda et al. | |
| 2007/0233815 A1 | 10/2007 | Lu et al. | |
| 2007/0233855 A1 | 10/2007 | Brown et al. | |
| 2007/0291658 A1 | 12/2007 | Knapik et al. | |
| 2008/0039032 A1 | 2/2008 | Haumont et al. | |
| 2008/0059582 A1 | 3/2008 | Hartikainen et al. | |
| 2008/0162666 A1* | 7/2008 | Ebihara ................... H04L 67/06 | |
| | | | 709/217 |
| 2008/0162682 A1 | 7/2008 | Ramachandran et al. | |
| 2008/0163370 A1 | 7/2008 | Maynard | |
| 2008/0165796 A1 | 7/2008 | Martinez et al. | |
| 2008/0205288 A1 | 8/2008 | Herzog | |
| 2008/0225865 A1 | 9/2008 | Herzog | |
| 2008/0239988 A1 | 10/2008 | Ptasinski et al. | |
| 2008/0240140 A1 | 10/2008 | Dabagh et al. | |
| 2008/0295173 A1 | 11/2008 | Tsvetanov | |
| 2009/0044109 A1 | 2/2009 | Dunstan et al. | |
| 2009/0063878 A1* | 3/2009 | Schmidt ................. G06F 1/3209 | |
| | | | 713/310 |
| 2009/0125739 A1 | 5/2009 | Satoh | |
| 2009/0154474 A1 | 6/2009 | Arima et al. | |
| 2009/0205038 A1 | 8/2009 | Kumar et al. | |
| 2009/0210519 A1 | 8/2009 | Zill et al. | |
| 2009/0240794 A1 | 9/2009 | Liu et al. | |
| 2009/0271517 A1 | 10/2009 | Naylor et al. | |
| 2009/0279463 A1 | 11/2009 | Kuliner et al. | |
| 2009/0309707 A1 | 12/2009 | Kamprath | |
| 2009/0323570 A1 | 12/2009 | Ginzburg et al. | |
| 2010/0023788 A1 | 1/2010 | Scott et al. | |
| 2010/0039971 A1 | 2/2010 | Lor et al. | |
| 2010/0046523 A1 | 2/2010 | Mekkattuparamban et al. | |
| 2010/0058082 A1 | 3/2010 | Locker et al. | |
| 2010/0069127 A1 | 3/2010 | Fiennes | |
| 2010/0070652 A1 | 3/2010 | Maciocco et al. | |
| 2010/0074108 A1 | 3/2010 | Olakangil et al. | |
| 2010/0106874 A1 | 4/2010 | Dominguez | |
| 2010/0146312 A1* | 6/2010 | Liao ....................... G06F 1/3203 | |
| | | | 713/310 |
| 2010/0161842 A1 | 6/2010 | Shan et al. | |
| 2010/0165897 A1 | 7/2010 | Sood | |
| 2010/0174808 A1 | 7/2010 | Dabagh et al. | |
| 2010/0185773 A1 | 7/2010 | Dunk | |
| 2010/0265844 A1 | 10/2010 | Salomone | |
| 2010/0278101 A1 | 11/2010 | Bengtsson et al. | |
| 2010/0312899 A1 | 12/2010 | Herzog et al. | |
| 2010/0332212 A1 | 12/2010 | Finkelman | |
| 2011/0069613 A1* | 3/2011 | Phillips ................ H04L 43/0876 | |
| | | | 370/229 |
| 2011/0102157 A1 | 5/2011 | Tarkoma | |
| 2011/0122818 A1 | 5/2011 | Dwyer et al. | |
| 2011/0151944 A1 | 6/2011 | Morgan | |
| 2012/0005501 A1 | 1/2012 | Maciocco et al. | |

(56) References Cited

U.S. PATENT DOCUMENTS

| | | | |
|---|---|---|---|
| 2012/0108225 A1 | 5/2012 | Luna et al. | |
| 2012/0110173 A1 | 5/2012 | Luna et al. | |
| 2012/0117401 A1 | 5/2012 | Gobriel et al. | |
| 2012/0311141 A1 | 12/2012 | Durazzo et al. | |
| 2012/0331087 A1 | 12/2012 | Luna et al. | |
| 2013/0007487 A1 | 1/2013 | Chakra et al. | |
| 2013/0019042 A1 | 1/2013 | Ertugay et al. | |
| 2013/0067059 A1 | 3/2013 | Gatta | |
| 2013/0067060 A1 | 3/2013 | Thaler et al. | |
| 2013/0067260 A1 | 3/2013 | Gatta | |
| 2013/0094551 A1* | 4/2013 | Ling | G06F 1/3209 375/222 |
| 2013/0151719 A1 | 6/2013 | Herzog | |
| 2013/0198544 A1* | 8/2013 | Ju | G06F 1/325 713/323 |
| 2014/0022973 A1* | 1/2014 | Kopikare | H04W 52/0241 370/311 |
| 2014/0089702 A1* | 3/2014 | Gupta | G06F 1/32 713/323 |
| 2014/0310546 A1 | 10/2014 | Gatta | |
| 2015/0052373 A1 | 2/2015 | Gatta et al. | |
| 2015/0215185 A1 | 7/2015 | Thaler et al. | |
| 2016/0226727 A1 | 8/2016 | Thaler et al. | |

FOREIGN PATENT DOCUMENTS

| | | |
|---|---|---|
| CN | 101465879 | 6/2009 |
| CN | 102014148 | 4/2011 |
| EP | 767558 | 4/1997 |
| EP | 1308827 | 5/2003 |
| EP | 1463249 | 9/2004 |
| JP | 2000235433 | 8/2000 |
| JP | 2004362020 | 12/2004 |
| JP | 2006033026 | 2/2006 |
| JP | 2006157673 | 6/2006 |
| JP | 2006164252 | 6/2006 |
| JP | 2007158870 | 6/2007 |
| JP | 2007183797 | 7/2007 |
| JP | 2008046940 | 2/2008 |
| JP | 2010520668 | 6/2010 |
| JP | 2011065653 | 3/2011 |
| JP | 2011150610 | 8/2011 |
| KR | 20040070096 | 8/2004 |
| WO | 2004017605 | 2/2004 |

OTHER PUBLICATIONS

"Restriction Requirement Issued in US Appl. No. 12/480,560", Mailed Date: Jan. 6, 2012, 6 Pages.
"Final Office Action Issued in U.S. Appl. No. 13/182,195", Mailed Date: Mar. 28, 2014, 14 Pages.
"Non-final Office Action Issued in U.S. Appl. No. 13/182,195", Mailed Date: Sep. 11, 2013, 12 Pages.
"Non-Final Office Action Issued in U.S. Appl. No. 13/229,325", Mailed Date: Aug. 12, 2013, 10 Pages.
"Non-Final Office Action Issued in U.S. Appl. No. 13/229,325", Mailed Date: Feb. 7, 2014, 13 Pages.
"Non-Final Office Action Issued in U.S. Appl. No. 13/229,364", Mailed Date: Dec. 19, 2013, 11 Pages.
"Non-Final Office Action Issued in U.S. Appl. No. 13/229,388", Mailed Date: May 6, 2014, 9 Pages.
"Non-Final Office Action Issued in U.S. Appl. No. 13/229,388", Mailed Date: Jul. 3, 2013, 10 Pages.
"Non-Final Office Action Issued in U.S. Appl. No. 13/229,388", Mailed Date: Nov. 14, 2013, 11 Pages.
"Final Office Action Issued in U.S. Appl. No. 13/764,663", Mailed Date: Jun. 11, 2015, 31 Pages.
"Non-Final Office Action Issued in U.S. Appl. No. 13/764,663", Mailed Date: Jan. 13, 2015, 27 Pages.
"Non-Final Office Action Issued in U.S. Appl. No. 14/314,423", Mailed Date: Mar. 23, 2015, 13 Pages.
"Restriction Requirement Issued in U.S. Appl. No. 14/679,202", Mailed Date: Aug. 13, 2015, 7 Pages.
"Search Report Issued in European Patent Application No. 16186334.5", Mailed Date: Dec. 21, 2016, 6 Pages.
"First Office Action Issued in Chinese Patent Application No. 201210328919.4", Mailed Date: Jan. 27, 2015, 13 Pages.
Office Action issued in European Patent Application No. 16186334.5 mailed Jan. 11, 2017.
Third Office Action Issued in Chinese Patent Application No. 201210328635.5 mailed Jan. 8, 2016, 7 pages.
"Extended EP Search Report" EP App. No. 11871916.0, Jun. 11, 2015, 8 pages.
"Extended EP Search Report" EP App. No. 11872022.6 Jul. 27, 2015, 8 pages.
Chinese Office Action for Application No. 201210328635.5, Jun. 17, 2015, 11 pages.
Chinese Office Action for Application No. 201210329033.1 Aug. 26, 2015, 10 pages.
"Extended EP Search Report" EP App. No. 11871952.5, Mar. 30, 2015, 7 pages.
"inetd—Wikipedia, the free encyclopedia", Retrieved at http://en.wikipedia.org/wiki/Inetd, on May 21, 2015, 3 pages.
Supplementary EP Search Report for EP App. No. 11872022.6, Apr. 8, 2015, 5 pages.
Chinese Office Action App. No. 201210328635.5, Oct. 10, 2014, 14 pages.
Chinese Office Action App. No. 2012103289419.4, Jan. 27, 2015, 13 pages.
Chinese Office Action App. No. 201210329033.1, Dec. 12, 2014, 11 pages.
International Search Report and Written Opinion for PCT/US2011/055706 dated Sep. 27, 2012, 10 pages.
International Search Report and Written Opinion for PCT/US2011/055655 dated Sep. 27, 2012, 9 pages.
International Search Report and Written Opinion for PCT/US2011/055702 dated Sep. 28, 2012, 9 pages.
"WebServer Scalability" retrieved 2003, 53 pages.
Acquaviva et al. "Remote Power Control of Wireless Network Interfaces", Journal of Embedded Computing—Low-power Embedded Systems, vol. 1, Issue 3, Aug. 2005, 10 pages.
Agarwal et al. "Somniloquy: Augmenting Network Interfaces to Reduce PC Energy Usage" Symposium on Networked Systems Design and Implementation (NDSI) 2009, pp. 365-380.
Barrett "iGlance and Adaptive KeepAlives", May 10, 2009, 3 pages.
Barrett "Software Engineering, Design and Implementation of Emergent Networks", May 11, 2009, 6 pages.
Deri et al. "Wire-Speed Hardware-Assisted Traffic Filtering with Mainstream Network Adapters", Oct. 28, 2010, 14 pages.
Douglis et al. "Adaptive Modem Connection Lifetimes", Apr. 14, 2009, 20 pages.
Huitema, "RFC 4380 Teredo—Section 5.2.7 Optional Refresh Interval Determination Procedure," Teredo: Tunneling IPv6 over UDP through Network Address Translations (NATs) Aug. 22, 2011, 2 pages.
Koskinen, "Utilizing Multiple Radios for Energy Efficiency" Aug. 30, 2011, 6 pages.
Kulkarni et al. "IDS: An Energy Efficient Communication Scheme for Connected Mobile Platforms" IEEE International Conference on Communications, 2009, Jun. 18, 2009, 6 pages.
Lehmus et al. "Methods for Identifying Unwanted Network Traffic" TKKT-110.5290 Seminar on Network Security, Oct. 11-12, 2007, 7 pages.
MacDonald et al. "RFC 5780 NAT Behavior Discovery—Section 4.6 Binding Lifetime Discovery" NAT Behavior Discovery Using Session Traversal Utilities for NAT (STUN). Internet Engineering Task Force (IETF) Aug. 22, 2011, 2 pages.
Nedevschi "Skilled in the Art of Being Idle: Reducing Energy Waste in Networked Systems" Symposium on Networked Systems Design and Implementation (NSDI) 2009, Apr. 23, 2009 pp. 381-394.
Price, et al. "Adapting to NAT Timeout Values in P2P Overlay Networks" Apr. 19, 2010, 7 pages.
Price et al. "Still Alive: Extending Keep-Alive Intervals in P2P Overlay Networks" Nov. 11, 2009, 10 pages.

(56) References Cited

OTHER PUBLICATIONS

Sabhanatarajan et al. "Smart-NICs: Power Proxying for Reduced Power Consumption in Network Edge Devices" IEEE Computer Society Annual Symposium on VLSI 2008, 6 pages.
Weisenberg et al. "Putting it on the NIC: A Case Study on Application Offloading to a Network Interface Card (NIC)" IEEE CCNC 2006 proceedings, Jan. 8-10, 2006, pp. 1013-1017.
Wu et al. "A Petri Net Approach to Analyze the Effect of Persistent Connection on the Scalability of Web Services" Apr. 14, 2009, 4 pages.
Zheng, "Design, Analysis and Empirical Evaluation of Power Management in Multi-Hop Wireless Networks" Dissertation, 2004, 157 pages.
Office Action received in Russian Patent Application No. 2014108876 (w/o English translation) Sep. 10, 2015, 3 pages.
Notice of Allowance issued in Russian Patent Application No. 2014108876, mailed Apr. 4, 2016, 14 pages.
Office Action issued in European Patent Application No. 11871952.5, mailed Feb. 19, 2016, 5 pages.
Office action issued in Chinese Patent Application no. 201210329033.1, mailed Feb. 24, 2016, 5 pages.
Office Action issued in Japanese Patent Application No. 2014-529679, mailed Dec. 8, 2015, 9 pages.
International Preliminary Report on Patenetability issued in PCT Application No. PCT/US2011/055655, mailed Mar. 20, 2014, 5 pages.
Bilorusets "Web Services Reliable Messaging Protocol (WS-Reliable Messaging)" Mar. 2004 [Retrieved from Internet Nov. 3, 2009].
Mukhi et al. "Supporting Policy-Driven Behaviors in Web Services: Experiences and Issues" International Conference on Service Oriented Computing, Proceedings of the 2nd International Conference on Service Oriented Computing, pp. 322-328, 2004 [Retrieved from IEEE on Nov. 3, 2009].
Vogels "Web Services Are Not Distributed Objects" Internet Computing, IEEE, Nov.-Dec. 2003, vol. 7, Issue 6, pp. 59-66 [Retrieved from IEEE on Nov. 3, 2009].
Plank et al. "The Effect of Timeout Prediction and Selection on Wide Area Collective Operations" Network Computing and Applications, 2001, IEEE International Symposium on Oct. 8-10, 2001, pp. 320-329.
Lee et al. "Wireless Reliable Messaging Protocol for Web Services" Web Services, 2004 Proceedings, IEEE International Conference on San Diego, CA Jul. 6-9, 2004, pp. 350-357.
Iwasa et al. "Web Services Reliable Messaging TC: WS-Reliability 1.1" Aug. 24, 2004, pp. 172.
Fielding et al. "Hypertext Transfer Protocol—Introduction" pp. 1-5 [Retrieved Feb. 7, 2005].
Fielding et al. "Hypertext Transfer Protocol—Status Code Definitions" pp. 1-11 [Retrieved Feb. 7, 2005].
Banks et al. "HTTPR Specification", Francis Parr ed. Apr. 1, 2002, pp. 1-57.
Booth et al. "Web Services Architecture—W3C Working Group Note" Feb. 11, 2004, pp. 1-106.
"Office Action Issued in Japanese Patent Application No. 2014-529679", Mailed Date: Sep. 6, 2016, 8 Pages.
"Office Action Issued in Australian Patent Application No. 2011376302", Mailed Date: Sep. 9, 2016, 2 Pages.
"Office Action Issued in Russian Patent Application No. 2014108876", Mailed Date: Feb. 3, 2016, 3 Pages. (without English Translation).
"Office Action Issued in Chinese Patent Application No. 201210329033.1", Mailed Date: Oct. 25, 2016, 11 Pages.
Pering et al. "CoolSpots: Reducing the Power Consumption of Wireless Mobile Devices with Multiple Radio Interfaces", Mobisys 2006, pp. 220-232.
Office Action issued in European Patent Application No. 16186334.5, mailed Jan. 11, 2017.
U.S. Appl. No. 14/526,391, filed Aug. 21, 2015, Office Action.
U.S. Appl. No. 14/679,202, filed Sep. 24, 2015, Notice of Allowance.
U.S. Appl. No. 14/526,391, filed Oct. 15, 2015, Office Action.
U.S. Appl. No. 14/526,391, filed Apr. 26, 2016, Notice of Allowance.
U.S. Appl. No. 14/526,391, filed Aug. 12, 2016, Notice of Allowance.
U.S. Appl. No. 15/018,430, filed Sep. 27, 2016, Office Action.
U.S. Appl. No. 15/018,430, filed Nov. 7, 2016, Notice of Allowance.

* cited by examiner

1600

1602
Determine for each of a plurality of applications executable on a computing device one or more server timeout intervals specified to maintain a notification channel with a respective endpoint via a network

1604
Calculate a keep alive interval from the one or more server timeout intervals for each of the plurality of applications

1606
Use the keep alive interval to wake a network interface device as specified to maintain the notification channels

Fig. 16

KEEP ALIVE MANAGEMENT

CROSS-REFERENCE TO RELATED APPLICATIONS

This application is a continuation of U.S. patent application Ser. No. 14/526,391 filed on Oct. 28, 2014, entitled "KEEP ALIVE MANAGEMENT," which issued as U.S. Pat. No. 9,544,213 on Jan. 10, 2017, which is a continuation of U.S. patent application Ser. No. 13/229,325 filed on Sep. 9, 2011, entitled "KEEP ALIVE MANAGEMENT," which issued as U.S. Pat. No. 8,892,710 on Nov. 18, 2014, both of which applications are incorporated herein by reference in their entirety.

BACKGROUND

Users have access to an ever increasing variety of computing devices that may be configured for network usage. For example, users may interact with a desktop computer, a mobile phone, a tablet computer, and so on to interact via wired or wireless networks.

Conventional techniques that were employed to access these networks, however, were often inefficient and therefore could consume a significant amount of resources, including power, processing, and network resources. Consequently, these conventional techniques could limit functionality available to a user of the device.

BRIEF SUMMARY

Wake pattern management techniques are described. In one or more implementations, network traffic received by a network interface device of a computing device is monitored and a traffic pattern is recognized in the monitored network traffic. An application of the computing device is identified that corresponds to the recognized traffic pattern and responsive to this identification, at least a portion of the identified application is woken.

In one or more implementations, a traffic pattern is registered as corresponding to an application configured for execution on the computing device. Responsive to recognition of the traffic pattern in network traffic while the application is in a suspended state, a transition of at least a portion of the application is triggered from the suspended state to an active state.

In one or more implementations, one or more computer-readable storage media comprise instructions stored thereon that, responsive to execution by a computing device, cause the computing device to implement an operating system configured to support a technique to wake at least a portion of a suspended application in response to identification of an incoming packet received via a network interface device of the computing device.

Operating system management of network interface devices is also described. In one or more implementations, a determination is made by an operating system that network traffic associated with one or more applications of the computing device has completed. Responsive to the determination, a network interface device is caused to transition to a mode to reduce power consumption of the network interface device by the operating system.

In one or more implementations, a network interface device is made available to one or more applications of the computing device by an operating system when the network interface device is in a high power mode. The network interface device is made unavailable to the one or more applications of the computing device by the operating system when the network interface device is in a low power mode.

In one or more implementations, one or more computer-readable storage media comprise instructions stored thereon that, responsive to execution by a computing device, causes the computing device to implement an operating system configured to support a technique restrict access by one or more applications of the computing device to a network interface device that is placed in a mode to reduce power consumption, the network interface device configured to wake from the mode in response to receipt of a push notification.

Keep alive management techniques are also described. In one or more implementations, a keep alive interval is calculated by an operating system of the computing device. The keep alive interval is used to maintain one or more notification channels between one or more applications of the computing device and a network.

In one or more implementations, a determination is made for each of a plurality of applications executable on the computing device of one or more server timeout intervals specified to maintain a notification channel with a respective endpoint via a network. A keep alive interval is calculated from the one or more server timeout intervals for each of the plurality of applications. The keep alive interval is used to wake a network interface device as specified to maintain the notification channels.

In one or more implementations, one or more computer-readable storage media comprise computer executable instructions that, responsive to execution by a computing device, cause the computing device to implement an operating system configured to use a keep alive interval to maintain notification channels between a plurality of applications that are executable on the computing device and respective one or more endpoints via a network, the keep alive interval calculated based on a one or more network timeout intervals of one or more intermediary devices of the network and one or more server timeout intervals of respective endpoints with which the one or more applications communicate via the network.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 16 depicts a procedure in an example implementation in which a keep alive interval is calculated to batch keep alive communications from applications.

DETAILED DESCRIPTION

Overview

Figure 1:
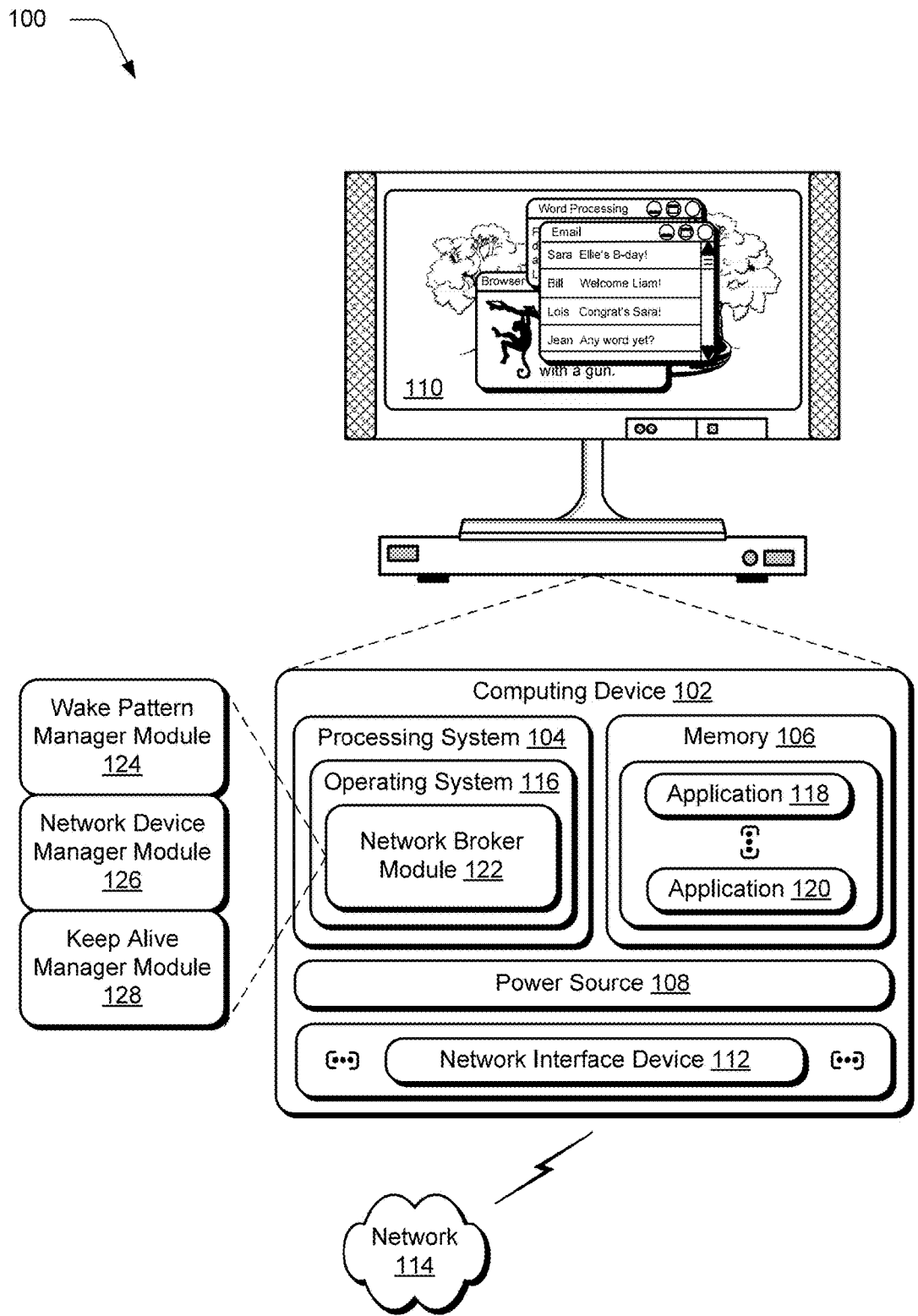
FIG. 1 is an illustration of an environment in an example implementation that is operable to employ a network broker module to manage network communication of one or more applications of a computing device.

Network connected applications typically involve an ability to maintain a long running connection in order to stay "up to date." However, under conventional techniques this may come at the expense of keeping a network interface device (e.g., a network interface card) connected to ensure reachability, which may adversely affect resource usage of a computing device. For example, conventional techniques allowed applications and services of a computing device unfettered access to the network interface device. Hence, an operating system was typically not aware at any given point in time if the network interface device was being used by an application. This may prevent the device from going into a low power mode until an idle is detected, which may take thirty seconds and thus may cause a significant impact on a power supply, e.g., battery life.

Accordingly, techniques are described herein in which an operating system component called a network broker module may be utilized to coordinate use of the network interface devices of the computing device. For example, the network interface device may employ a wake pattern manager module to determine which applications of the computing device, if any, are to be woken in response to receipt of network traffic. The wake pattern manager module, for instance, may detect whether a pre-registered pattern is present in the network traffic, and if so, wake a corresponding application. In this way, the wake pattern manager module may allow applications that leverage network connects to entire a suspended state yet still provide an "always on/always connected" user experience. Further discussion of the wake pattern manager module may be found in relation to FIGS. 2-4.

In another example, the network broker module may incorporate functionality of a network device manager module. The network device manager module may be used to cause the network interface device to enter a low power mode when the module determines that network traffic involving applications of the computing device has completed, e.g., by monitoring callbacks. Thus, the network device manager module 126 of the operating system may be positioned as an intermediary between the network interface device and the applications. As an intermediary, the operating system may have knowledge of networking activity and therefore can deterministically tell if the network interface device can enter a low power mode, e.g., a network quiet mode. Further discussion of the network device manager module may be found in relation to FIGS. 5-12.

In a further example, the network broker module may incorporate functionality of a keep alive manager module. The keep alive manager module may be used to "keep alive" network connections (e.g., notification channels) while applications are in a suspended state, and thus may lower resource usage associated with the applications. Further, the keep alive manager module may be used to allow the network interface device to enter a low power mode and "wake" to maintain the network connections and thus may lower resource usage associated with the network interface device, itself. A variety of other functionality may also be incorporated by the keep alive manage module, such as to dynamically determine a keep alive interval, further discussion of which may be found in relation to FIGS. 13-18.

In the following discussion, an example environment is first described that may employ the techniques described herein. Example sections are then used to describe example functionality of the wake pattern manager module, network device manager module, and keep alive manager module. An implementation example is then described which may incorporate functionality from the previously described sections. It should be readily apparent that the techniques described herein are not limited to performance in the example environment and the example environment is not limited to performing the example techniques.

Example Environment

FIG. 1 is an illustration of an environment 100 in an example implementation that is operable to employ network broker techniques described herein. The illustrated environment 100 includes a computing device 102 that includes a processing system 104 (e.g., one or more processors, functional blocks), memory 106, a power source 108, a display device 110, and one or more network interface devices 112 configured to provide network connections (e.g., notification channels) vi a network 114. In the following discussion represented entities may be indicative of one or more entities and thus reference may be made interchangeably to single or plural forms of the entities, e.g., network interface device 112, the network interface devices 112, and so on.

The computing device 102 may be configured in a variety of ways. For example, the computing device 102 may be configured as a computer that is capable of communicating over the network 114, such as a desktop computer, a mobile station, an entertainment appliance, a set-top box communicatively coupled to a display device, a wireless phone, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations (e.g., a server farm), a remote control and set-top box combination, an image capture device and a game console, and so on.

Although the network 114 is illustrated as the Internet, the network may assume a wide variety of configurations. For example, the network 114 may include a wide area network (WAN), a local area network (LAN), or an intranet and thus the network interface device 112 may be configured to access these networks via a wired connection. The network 114 may also be configured for access via wireless techniques, such as a wireless wide area network (WWAN), a wireless local area network (WLAN), a cellular network (e.g., a 3G, 4G, LTE network), and so on. The network interface device 112 may be representative of physical devices and also virtual network devices, such as those used to support a virtual private network, tunneling, and so on. Thus, although a single network 114 is shown, the network 114 may be representative of a plurality of networks.

The computing device 102 is further illustrated as including an operating system 116. The operating system 116 is configured to abstract underlying functionality of the computing device 102 to applications 118, 120 that are executable on the computing device 102. For example, the operating system 116 may abstract processing system 104, memory 106, power source 108 (e.g., battery or wired connection), and/or display device 110 functionality of the computing device 102 such that the applications 118, 120 may be written without knowing "how" this underlying functionality is implemented. The applications 118, 120, for instance, may provide data to the operating system 116 to be rendered and displayed by the display device 112 without understanding how this rendering may be performed.

Likewise, the operating system 116 may also abstract network connection functionality to the applications 118, 120 through use of a network broker module 122. The network broker module 122 is representative of functionality to manage usage of the network interface device 112 by the applications 118, 120 as well as operation of the network interface device 112 itself.

As previously described the network broker module 122 may incorporate a variety of different functionality to perform this management. For example, the network broker module 112 may incorporate a wake pattern manager module 124 that is configured to wake one or more of the applications 118, 120 upon identification of a particular traffic pattern. The particular traffic pattern, for instance, may be pre-registered by the application and thus when the pattern is recognized, the wake pattern manager module 124 may wake the corresponding one of the applications 118, 120 as opposed to conventional techniques in which an entirety of the computing device 102 was woken, including each of the applications 118, 120. Further discussion of the wake pattern manager module 124 may be found in relation to FIGS. 2-4.

The network broker module 122 is also illustrated as including a network device manager module 126. As mentioned earlier, this module is representative of functionality to manage operation of the network interface device 112 as well as availability of the network interface device 112 to applications 118, 120 of the computing device 102. This may include causing the network interface device 112 to enter a mode to reduce power consumption when the network device manager module 126 determines that network traffic involving the applications 118, 120 has completed.

Additionally, the network device manager module 126 may make the network interface device 112 unavailable to the applications 118, 120 for periods of time in this mode such that the applications 118, 120 do not unnecessarily wake the network interface device 112. In this way, the network device manager module 126 may "black hole" communications from applications 118, 120 to the network interface device. Further discussion of the network device manager module 126 may be found in relation to its corresponding section in the following discussion that begins in relation to FIGS. 5-12.

The network broker module 122 is further illustrated as including a keep alive manager module 128. The keep alive manager module 128 is representative of functionality that may be used to maintain network connections, even for applications 118, 120 in a suspended state. The keep alive manager module 128, for instance, may communicate with one or more servers of a network service to keep active a network connection between the service and the computing device 102 over the network 114. The keep alive manager module 128 may also include functionality to dynamically determine an interval at which this activity is to occur and thus may further conserve resources of the computing device 102. Further discussion of the keep alive manager module 128 may be found in relation to its corresponding section in the following discussion that begins in relation to FIGS. 13-18.

Although the network broker module 122 and its corresponding wake pattern manager module 124, network device manager module 126, and keep alive manager module 128 are illustrated as part of the operating system 116, it should be readily apparent that this functionality may be implemented by a variety of different entities. Examples of such entities include standalone applications, third-party plugins, and so on.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the network broker techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Wake Pattern Manager Module

Figure 2:
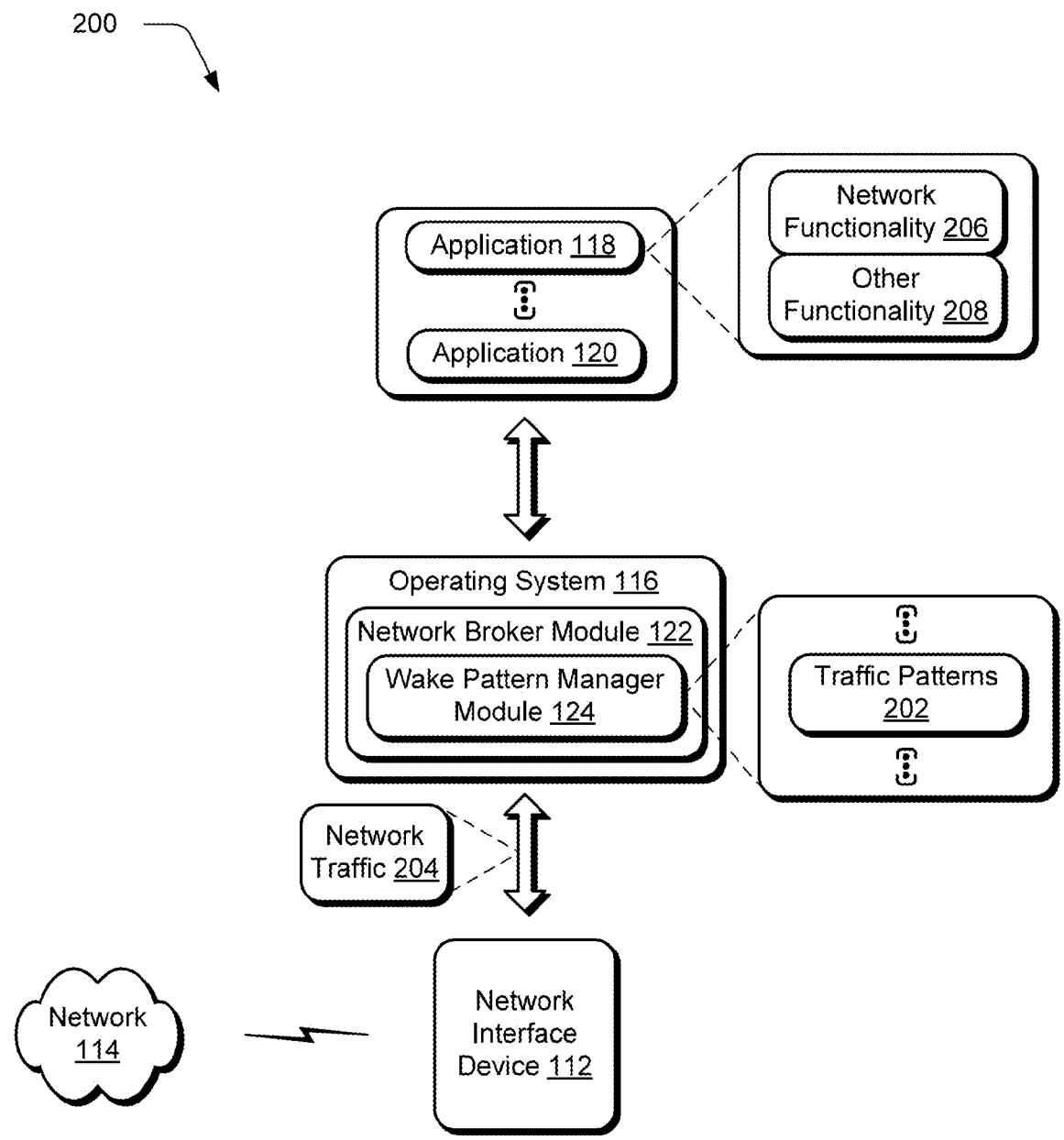
FIG. 2 is an illustration of a system in an example implementation showing the network broker module of FIG. 1 in greater detail as employing a wake pattern manager module.

FIG. 2 is an illustration of a system 200 in an example implementation showing example operation of a wake pattern manager module 124 of the network broker module 122 of FIG. 1. As previously described, conventional techniques involved actively running processes for an application to be reachable. Hence, applications that involve use of relatively long running network connections could send and receive data at any time, which could have a direct impact on the resources of the computing device 102, such as battery life.

In this example, however, the operating system 116 may employ the network broker module 122 to support an "always on/always connected" user experience. In this example, the experience is supported through use of the wake pattern manager module 124 which may be utilized to wake particular applications that are involved in network communication.

The wake pattern manager module 124, for instance, may permit the applications 118, 120 to register traffic patterns 202 that are indicative of the particular applications 118, 120. For example, application 118 may register a traffic pattern 202 that is different that a traffic pattern registered for application 120. Accordingly, the wake pattern manager module 124 may monitor network traffic 204 for the traffic patterns 202 and wake the corresponding applications 118, 120.

An application developer, for instance, may arrange a contract with the network broker module 122 of the operating system 116 to indicate certain events and a callback that is to be executed for each of these events. The network broker module 122 may then "plumb" a specific pattern of data received by the network interface device 112 via the network 114 as corresponding to one or more of the applications 118, 120 that registered for that traffic pattern 202.

Accordingly, the wake pattern manager module 124 of the network broker module 122 may interrupt the operating system 116 on receipt of an incoming packet described in a traffic pattern for application 118. In turn, the operating system 116 may wake the application 118 from a suspended state at the registered callback entry point and indicate the packet to the application 118. In this way, the wake pattern manager module 124 may support a technique to trigger a suspended application on an incoming packet from a pre-authorized remote endpoint. Further, this allows the operating system 116 to plumb a pattern even if the physical network interface device 112 does not support filtering of incoming packets, thereby allowing the operating system 115 to filter ingress packets.

The applications 118, 120 may also be configured to increase efficiency of resource usage of the computing device 102. For example, application 118 may be vectored to form different parts that may be executed separately. An illustrated example of this for application 118 includes vectoring of network functionality 206 as separate from other functionality 208 of the application 118, such as functionality involved in the generation of a user interface for the application 118.

Thus, continuing with the previous example the network broker module 122 may wake the network functionality 206 of the application 118, such as to indicate a packet that matches the specified traffic patterns 202 and execute a specific callback of application code without rehydrating code of the application 118 involved in generating the user interface of the application 118. Therefore, the application 118 may be configured to respond to network traffic 204 from a remote server in a resource efficient manner for data packets, a remote endpoint initiated keep alive, and so on. A variety of other examples of application 118 vectoring are also contemplated, such as separation of event handlers of the application 118.

The wake pattern manager module 124 may also support techniques to coalesce data for communication to the applications 118, 120, which may also be indicated by the traffic patterns 202. The wake pattern manager module 124, for instance, may receive data via a variety of different notification channels via the network 114 at the network interface device 112. Rather than communicate this data to the applications 118, 120 "right away," the wake pattern manager module 124 may coalesce this data for communication to the applications 118, 120 at a defined interval.

Thus, the resources of the computing device 102 used in executing the applications 118, 120 may be utilized together to further conserve when and how these resources are used. For instance, rather than receiving data for application 118, waking the application 118, and communicating the packet to the application 118 and then repeating this for a packet received for application 120, these packets may be cached and then forwarded.

In one or more implementations, the wake pattern manager module 124 may also leverage knowledge of user logins. For example, the wake pattern manager module 124 may utilize traffic patterns 202 for a user that is actively logged in to the computing device 102 but not for other users, may use patterns for a user that was most recently logged in, and so on. Naturally other implementations are also contemplated, such as implementations in which patterns are used for each user that is logged in, whether active or not.

Thus, an operating system was described that may be configured to support a technique to wake at least a portion of a suspended application in response to identification of an incoming packet received via a network interface device of the computing device. Further discussion of these techniques may be found in relation to the following procedures and implementation example.

Figure 3:
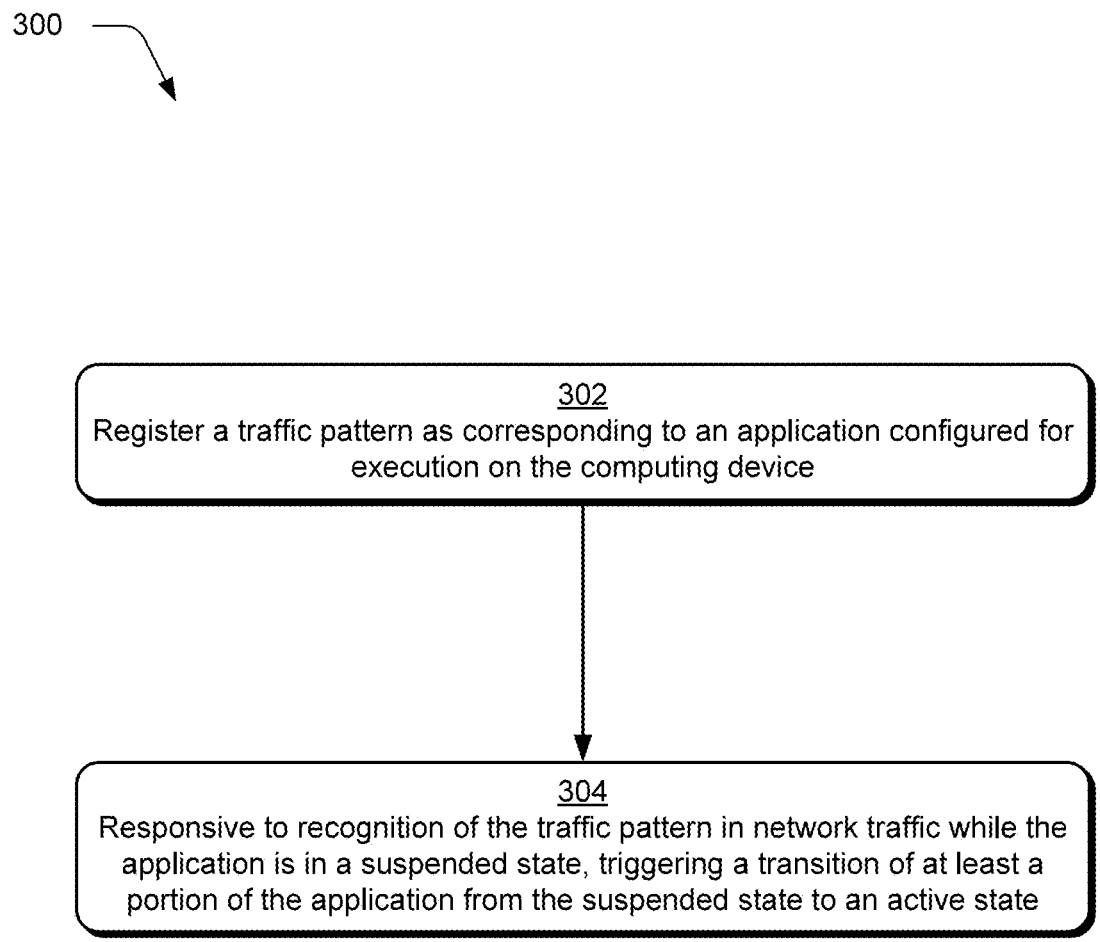
FIG. 3 is a flow diagram depicting a procedure in an example implementation in which recognition of a traffic pattern is used to transition at least a portion of an application from a suspended state to an active state.

FIG. 3 depicts a procedure 300 in an example implementation in which recognition of a traffic pattern is used to transition at least a portion of an application from a suspended state to an active state. Aspects of the procedure may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

A traffic pattern is registered as corresponding to an application configured for execution on the computing device (block 302). The traffic pattern 202, for instance, may be registered by the application 118 during installation of the application 118, through interaction with an API of a wake pattern manager module 124, and so on. Additionally, the traffic pattern 202 may be used to described a variety of different characteristics of network traffic 204, such as identify particular packets, callbacks, identify particular remote endpoints, and so forth.

Responsive to recognition of the traffic pattern in network traffic while the application is in a suspended state, at least a portion of the application is transitioned from the suspended state to an active state (block 304). The application 118 may be placed in a suspended state due to a variety of different factors. For example, the operating system 116 may be configured to place the application 118 in a suspended state when focus is moved to another application. The focus may be moved by minimizing a user interface of the application, movement of the user interface (e.g., window) from a foreground in a desktop user interface, navigation away from the user interface of the application 118 in an immersive environment, and so on. Thus, the operating system 116 may conserve resources of the computing device 102 by suspending execution of applications that are not available, directly, for user interaction.

As previously described, the wake pattern manager module 124 may recognize traffic patterns 202 from the network traffic 204 and transition at least a part of an application 118 (e.g., network functionality 206 but not other functionality 208) into an active state to process the identified network traffic 204. Thus, the wake pattern manager module 124 may transition a particular application 118 to which the network traffic 204 pertains and even a particular portion of the application 118. Another example of wake pattern manager module 124 usage may be found in relation to the following figure.

Figure 4:
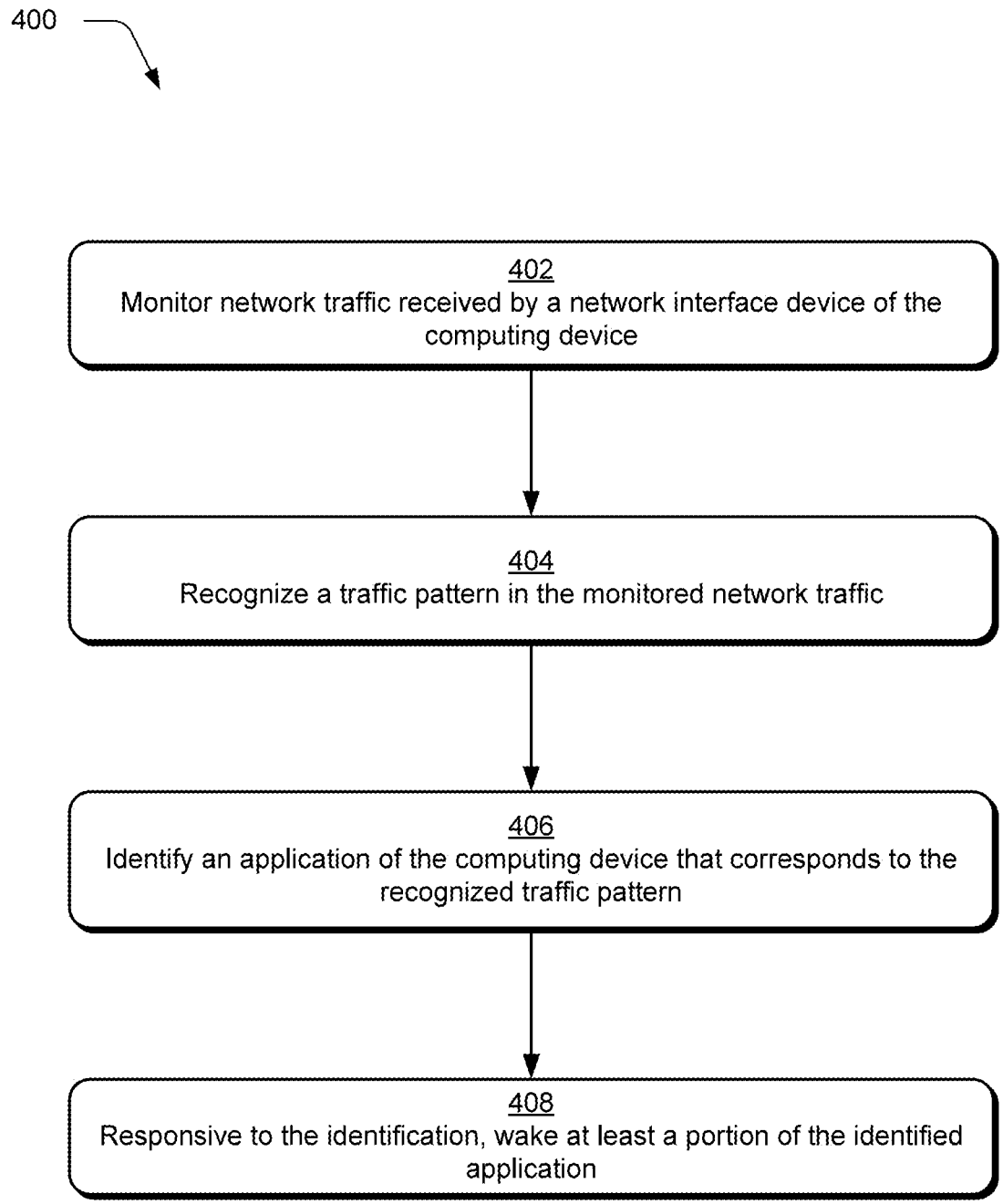
FIG. 4 is a flow diagram depicting another procedure in an example implementation in which recognition of a traffic pattern is used to wake at least part of an application.

FIG. 4 depicts a procedure 400 in an example implementation in which recognition of a traffic pattern is used to wake at least part of an application. Aspects of the procedure may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Network traffic received by a network interface device of a computing device is monitored (block 402). The computing device 102, for instance, may receive network traffic at a network interface device 112, which may be configured as a physical device, implemented as a virtual device to support a VPN and tunneling, and so on.

A traffic pattern is recognized in the monitored network traffic (block 404). As before, a variety of different traffic patterns may be recognized, such as packets, sending entities, and so on. From this traffic pattern, an application of the computing device is identified that corresponds to the recognized traffic pattern (block 406). For example, one or more applications may pre-register with the wake pattern manager module 124 to receive particular network traffic. Responsive to this identification, at least a portion of the identified application is woken (block 408), such as the network functionality 206, an entirety of the application 118, and so on. Further discussion of example operation of the wake pattern manager module 124 may be found in relation to the implementation example.

Network Device Manager Module

Figure 5:
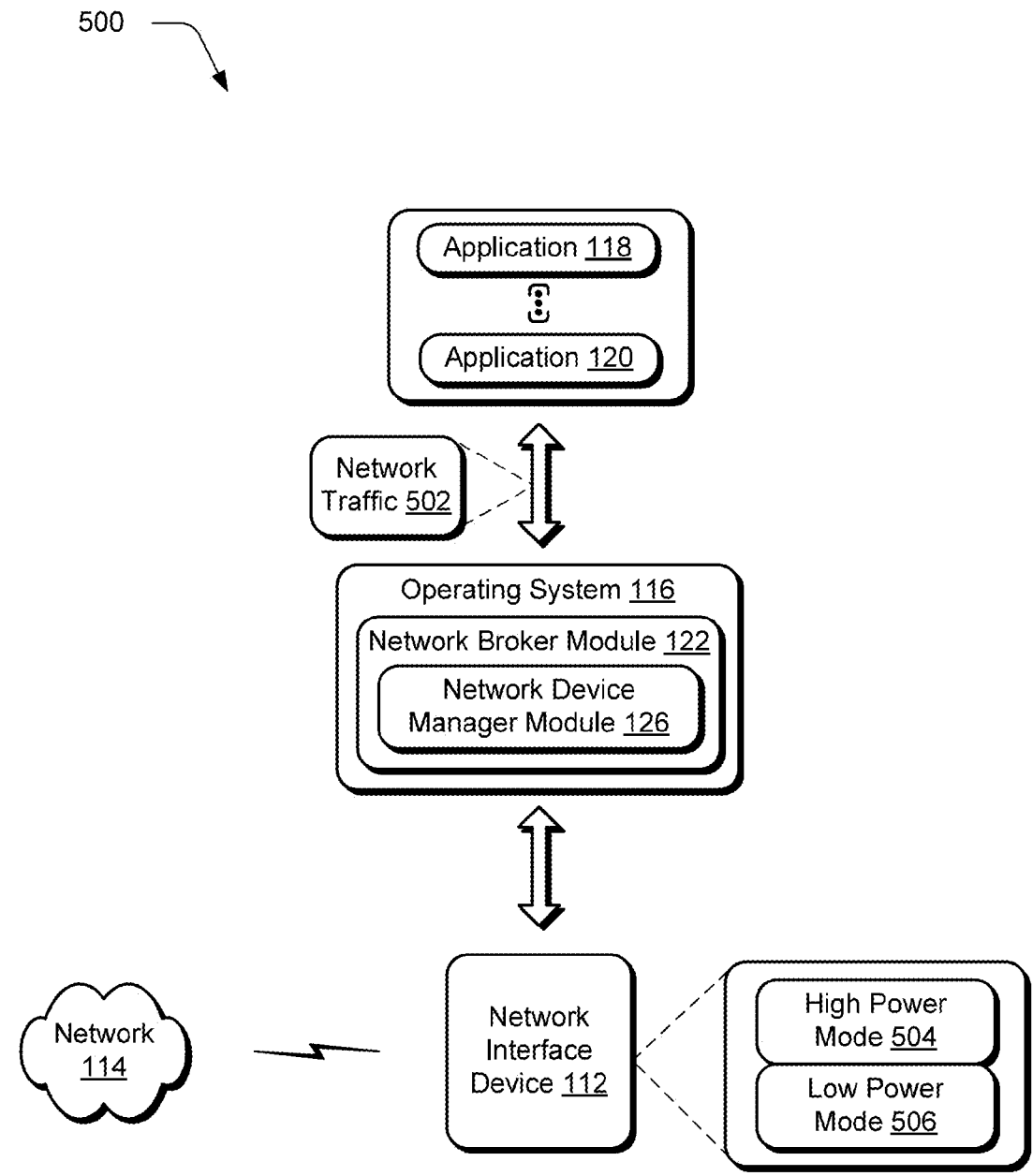
FIG. 5 is an illustration of a system in an example implementation showing the network broker module of FIG. 1 in greater detail as employing a network device manager module.

FIG. 5 is an illustration of a system 500 in an example implementation showing example operation of a network device manager module 126 of the network broker module 122 of FIG. 1. As previously described, the network broker module 122 and consequently the network device manager module 126 of the operating system 116 may be positioned as an intermediary between the network interface device 112 and the applications 118, 120. As an intermediary, the operating system 116 may have knowledge of networking activity and therefore can deterministically tell if the network interface device 112 may enter a low power mode, e.g., a network quiet mode.

For example, the network device manager module 126 may be used to cause the network interface device 112 to enter a low power mode when the module determines that network traffic 502 involving applications of the computing device has completed, e.g., by monitoring callbacks and determining when a last of the callbacks has completed. Thus, the network traffic 502 involves egress traffic from the applications 118, 120 in this example.

In response, the network device manger module 126 may cause the network interface device 112 to transition from a high power mode 504 to a low power mode 502. As the names denote, these modes are differentiated by an amount of power consumed by the network interface device 112 while in the modes. In one example, the high power mode 504 is configured to enable transmission and receipt of data by the network interface device 112. In this example, the low power mode 506 is configured such that transmission functionality of the network interface device 112 is temporarily disabled and thus has reduced power consumption. Thus, since outbound activity is suppressed and thus just wake patterns are plumbed, it means that the traffic that can impact the system are limited to packets which match the wake pattern, or when the system computes a time to initiate outbound activity like keep-alive activity. A variety of other examples are also contemplated.

In this way, the network device manager module 126 may proactively determine when use of the network interface device 112 is no longer desired for outbound traffic and react accordingly as opposed to previous techniques that relied on detection of periods of inactivity that could be as long as thirty seconds. Thus, the knowledge of the network traffic 502 afforded by positioning the operating system 116 as an intermediary may be used to conserve resources of the computing device 102.

The network device manager module 126 may also support techniques to prolong and/or maintain the low power mode 506 for the network interface device 112 for a desired period of time. As previously described, conventional techniques permitted unfettered access of the applications 118, 120 to the network interface device 112, which could have an adverse effect of resources of the computing device 102. Accordingly, the positioning of the network device manager module 126 as an intermediary between the applications 118, 120 and the network interface device 112 may be used to manage the high power and low power modes 504, 506.

For example, the network device manager module 126 may support "black holing" techniques to restrict access by the applications 118, 120 to the network interface device 112 while in a low power mode 506. This may be performed in a variety of ways, such as making the network interface device 112 unavailable, blocking communication of packets from the application 118, 120 to the network interface device 112, providing an error code back to the applications 118, 120 during the low power mode 506, indicating a dropped packet event, and so on. Therefore, the network device manager module 126 may limit an ability of the applications 118, 120 to wake the network interface device 112 from the low power mode 506 to the high power mode 504, thereby conserving resources of the computing device 102.

The network device manager module 126 may also support techniques to manage usage of a plurality of different network interface devices 112 by managing which of the network interface devices 112 may be accessed at a given point in time. For example, the computing device 102 may be configured as a mobile communication device (e.g., wireless phone) and include a network interfaces devices 112 configured to communicate over Wi-Fi and cellular (e.g., 3G, 4G, LTE) networks.

In an instance in which the network interface device 112 for Wi-Fi is in a high power mode, the network device manager module 126 may cause the network interface device 112 for the cellular network to enter a low power mode. Further, applications that attempt to interact with the cellular network may instead be routed to the Wi-Fi network. In this way, the network connection manager module 126 may prevent the applications 118, 120 from communicating with the "wrong" network interface device 112 and thereby conserve computing device 102 resources by not waking that device.

The network device manager module 126 may also be configured to maintain connectivity while in a low power mode. For example, the applications 118, 120 and/or services of the operating system 116 may desire to maintain Layer 2 connectivity to maintain a connection with an access point. This may involve periodically waking from the low power mode 506 at defined intervals to communicate with the access point. Likewise, Layer 3 connectivity may also be maintained using a similar techniques to maintain an IP address by communicating with a HTTP server, such as for an instance in which the server is configured to refresh the address at defined intervals. Further discussion of maintenance of network connectivity may be found in the "Keep Alive" section in the following discussion.

Figure 6:
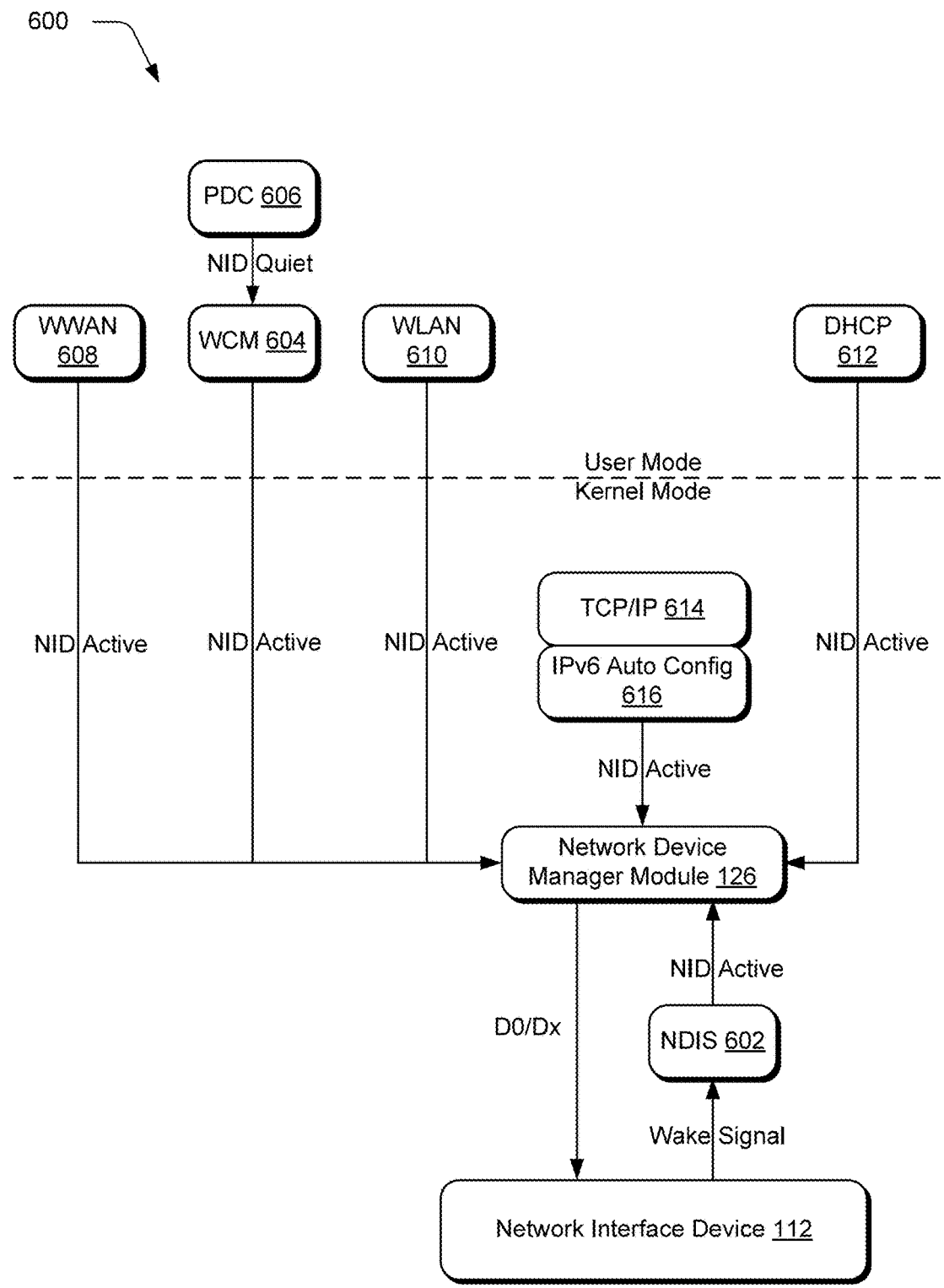
FIG. 6 is an illustration of another system in an example implementation showing example operation of a network device manager module.

FIG. 6 is an illustration of another system 600 in an example implementation showing example operation of the network device manager module 126. This system 600 is an implementation example of an architecture that may be employed for operating system 116 assisted management of the network interface device 112.

The network device manager module 126 is implemented in this example as a logical component residing in ndis.sys 602 and is responsible for controlling power modes for the network interface device 112. The network device manager module 126 may be configured to expose per-adapter NID Active state (e.g., NIC active state) to support granular power control over the network interface devices 112.

NID Active state may be implemented using a reference counter. When the counter reaches zero, the network device manager module 126 may transition the network interface device 112 to a low power state. When the counter is incremented from zero to one, the NDIS 602 may bring the network interface device 112 to a high power state, i.e., a "working" power state.

As illustrated, components of the operating system 116 may be used to increment and/or decrement the reference counter, e.g., by sending private IOCTLs to the NDIS 602, for a variety of purposes. In one or more implementations, a WCM 604 that is in communication with a power dependency coordinator (PDC) 606 is a sole component that is permitted to hold the NID Active reference for a "long" time, e.g. an entire duration of the Network Active period. Each of the other components is permitted to take NID Active reference for duration of a single operation, e.g., an IP address renewal.

The WCM 604 may be configured to listen to the network quiet entry/exit events generated by PDC 606 and translate them to NIC active states according to interface selection logic. WCM 604 may take a reference upon adapter arrival to prevent NDIS 602 from powering the network interface device 112 down.

WWAN 608 may use the NIC Active reference to enable select media specific functionality, e.g., a location scan function requested by a location sensor service. The WLAN 610 may use the NIC Active reference to select media specific operations, e.g., vendor specific functions controlled by an IHV provided service. The DHCP 612 client may be used to renew an IP address during a network quiet mode and thus may keep the NID Active reference during this operation to ensure availability of the network interface device 112. TCP/IP 614 may use the NID Active reference counter to keep the network interface device 112 in D0 during this operation to refresh IPv6 stateless address auto-configuration 616 during a network quiet mode. The NDIS 602 may use a temporary (e.g., 3 seconds) NIC Active reference during adapter initialization and upon each network interface device 112 generated wake signal. Therefore, if none of the other components desire use of the network interface device 112 by the timeout expiration, the network device manager module 126 may transition the network interface device 112 to a low power state.

Figure 7:
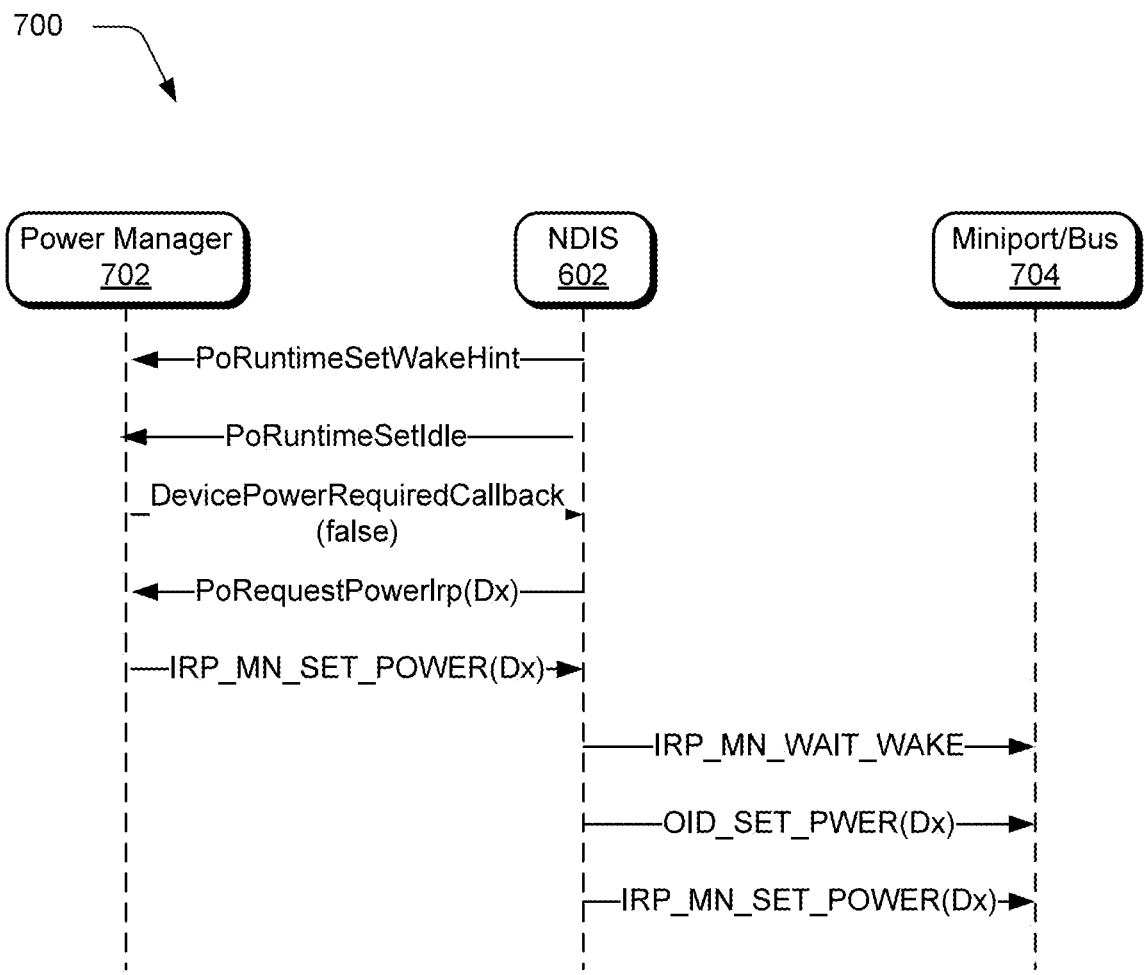
FIG. 7 depicts an example implementation showing a network interface device quiet transition.

FIG. 7 depicts an example implementation 700 showing a network interface device quiet transition. The implementation 700 includes the NDIS 602 of FIG. 6 as well as a power manager 702 and a miniport/bus 704. NDIS 602 executes this power transition operation when the NID Active reference counter becomes zero. During the NID quiet transition, the NDIS 602 may report the network interface device 112 as idle to the power manager 702 and waits for a confirmation before requesting a Dx IRP for the device.

Figure 8:
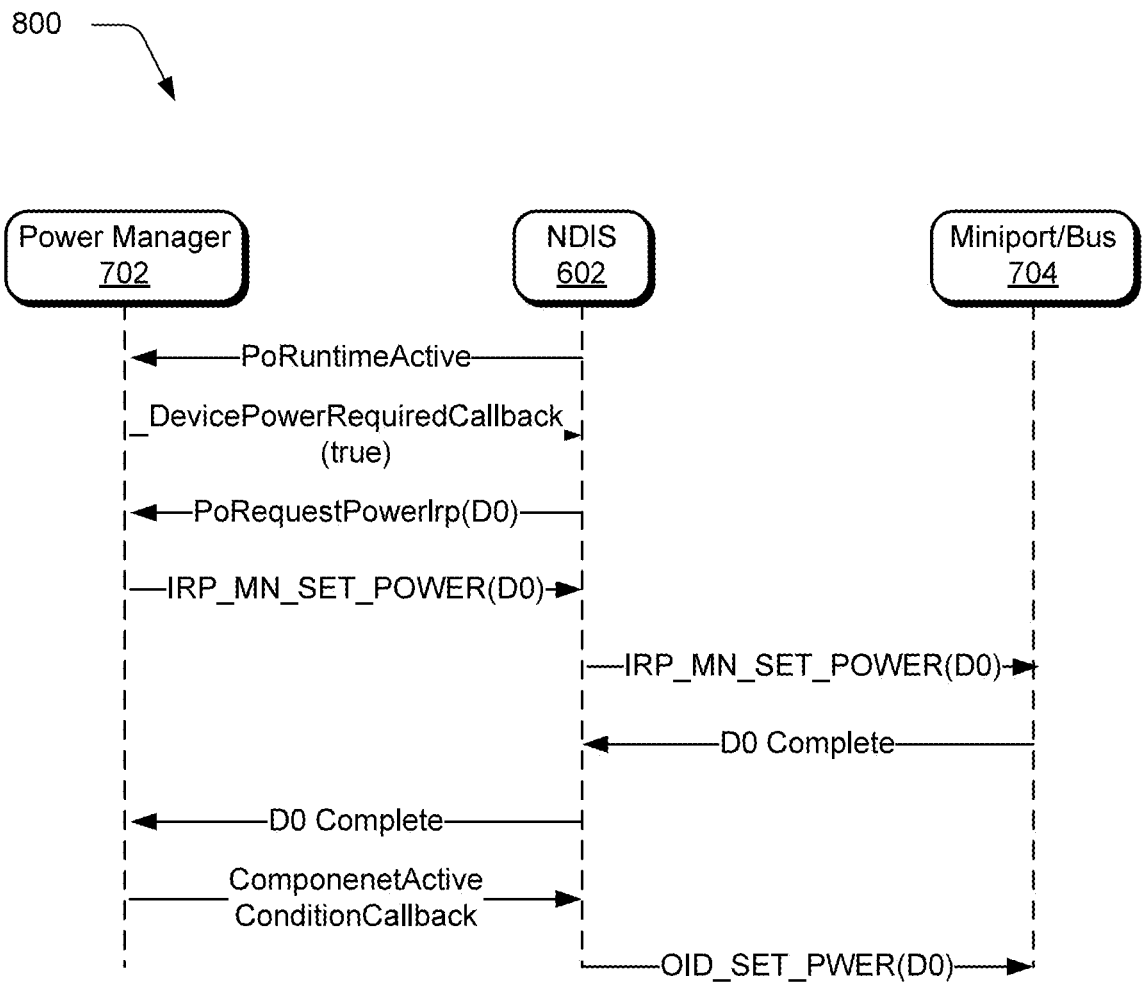
FIG. 8 depicts an example implementation showing a network interface device active transition.

FIG. 8 depicts an example implementation 800 showing a network interface device active transition. The implementation 800 includes the NDIS 602 of FIG. 6 as well as a power manager 702 and a miniport/bus 704 of FIG. 7. In the illustrated example, the NDIS 602 executes this power transition operation when the NID Active reference counter goes from zero to one. The NDIS 602 may request a device active state from the power manager 702 and wait for the "Power Required Callback." From this callback, the NDIS 602 requests D0 IRP for the device. Upon D0 IRP completion, the NDIS 602 waits for an "Active Condition Callback" before communicating the updated power state to the miniport/Bus 704 driver.

Figure 9:
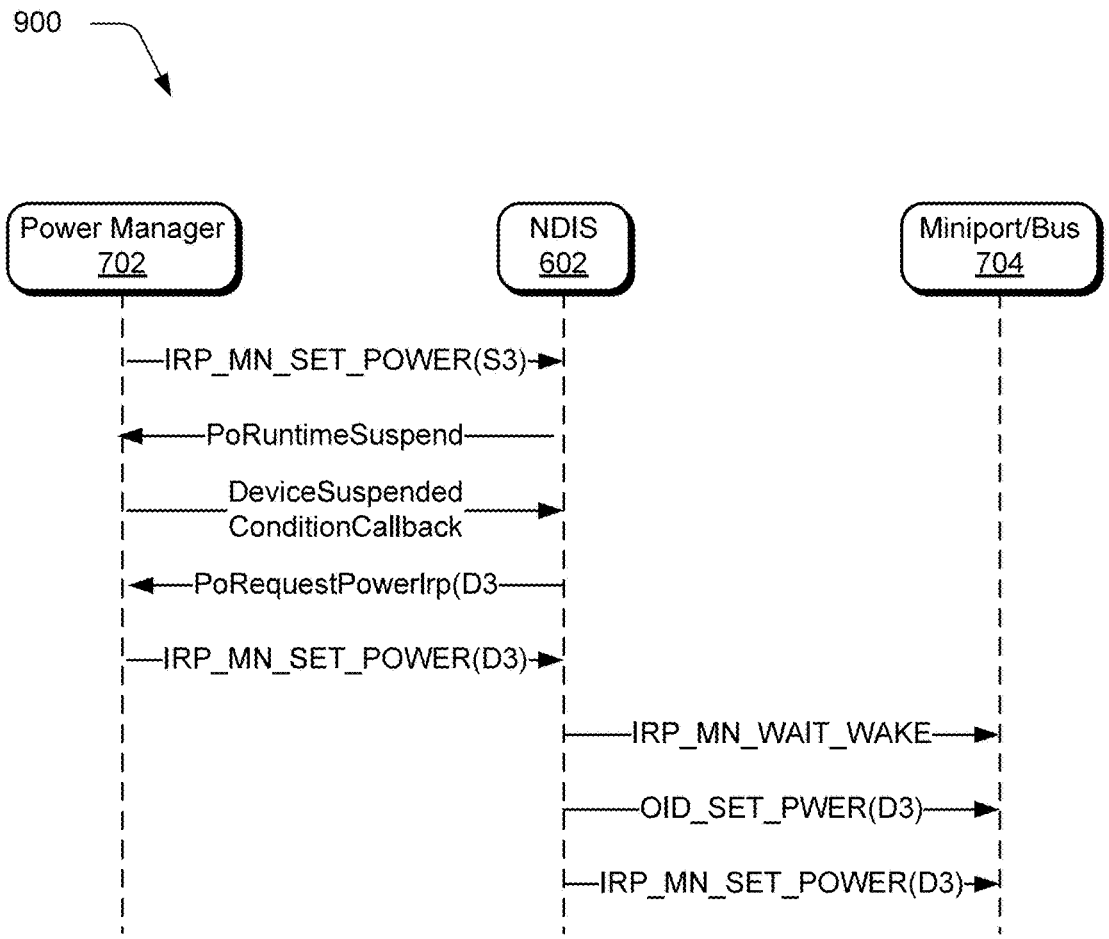
FIG. 9 depicts an example implementation showing a system sleep transition.

FIG. 9 depicts an example implementation 900 showing a system sleep transition. The implementation 900 also includes the NDIS 602 of FIG. 6 as well as a power manager 702 and a miniport/bus 704 of FIG. 7. During the system sleep transition, the NDIS 602 suspends power framework management by the power manager 702 for the device and waits for the confirmation before requesting a Dx IRP.

Figure 10:
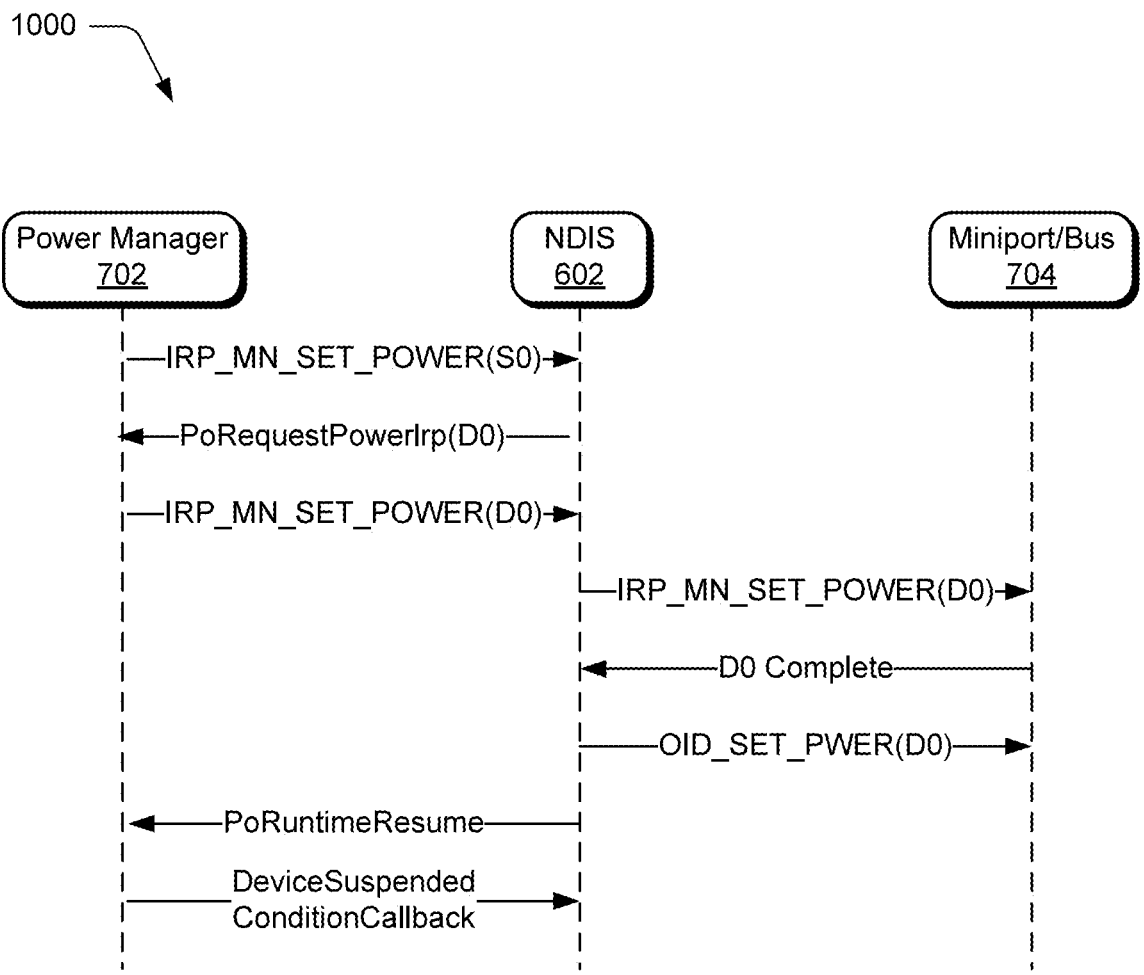
FIG. 10 depicts an example implementation showing a system resume transition.

FIG. 10 depicts an example implementation 1000 showing a system resume transition. The implementation 900 also includes the NDIS 602 of FIG. 6 as well as a power manager 702 and a miniport/bus 704 of FIG. 7. During a system resume transition, the NDIS 602 requests a D0 IRP for the network interface device 112 and causes power framework operations to be resumed by the power manager 702 upon D0 IRP completion.

Figure 11:
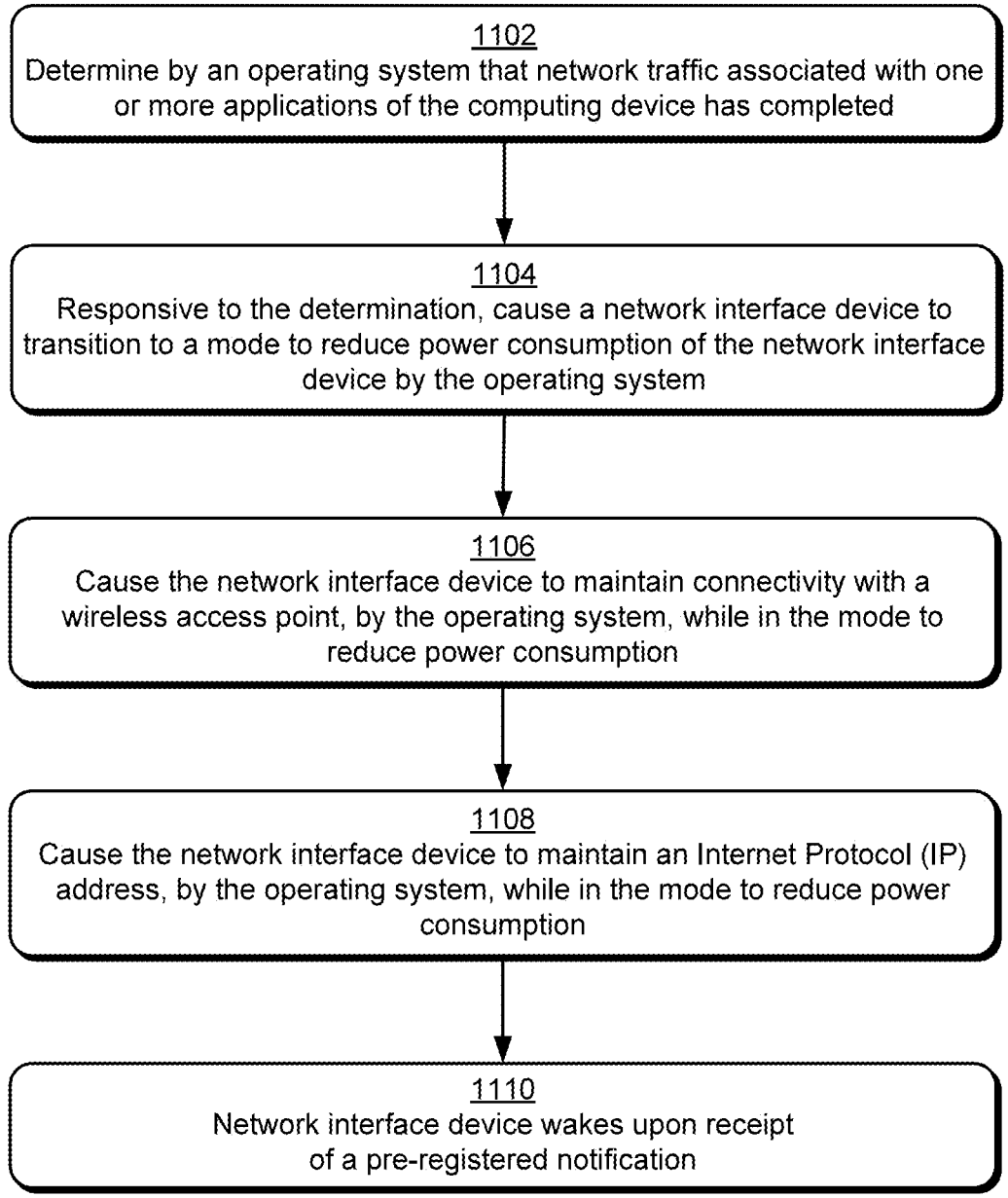
FIG. 11 is a flow diagram depicting a procedure in an example implementation in which a determination is made that network traffic has completed and a network interface device is transitioned to a low power mode by an operating system.

FIG. 11 depicts a procedure 1100 in an example implementation in which a determination is made that network traffic has completed and a network interface device is transitioned to a low power mode by an operating system. Aspects of the procedure may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment of FIG. 1 and the systems and example implementations of FIGS. 5-10.

A determination is made by an operating system that network traffic associated with one or more applications of the computing device has completed (block 1102). This determination may be made in a variety of ways. For example, the network device manager module 126 may monitor outbound and inbound traffic involving the applications 118, 120 and the network interface device 112. The network device manager module 126 may thus determine when replies have been provided to requests, e.g., callbacks have been completed. In this way, the network device manager module 126 may determine when each of the operations have been completed without waiting for a prescribed "idle" period.

Responsive to the determination, a network interface device is caused to transition to a mode to reduce power consumption of the network interface device by the operating system (block 1104). Continuing from the previous example, the network device manager module 126 may determine that the network traffic 502 has completed, and therefore cause the network interface device 112 to enter a mode to reduce power consumption, e.g., a low power mode 506.

The network device manager module 126 may also provide a variety of functionality for use in conjunction with this mode. For example, the network device manager module 126 may cause the network interface device 112 to maintain connectivity with a wireless access point, by the operating system, while in the mode to reduce power consumption (block 1106). Thus, in this example the network interface device 112 may maintain a layer two connection as previously described. In another example, the network device manager module 126 may cause the network interface device 112 to maintain an Internet Protocol (IP) address, by the operating system, while in the mode to reduce power consumption (block 1108). Therefore, in this example the network interface device 112 may maintain a layer three connection to refresh the IP address of the network interface device 112. A variety of other examples are also contemplated.

The network interface device may also be configured to wake upon receipt of a pre-registered notification (block 1110). For example, even though the network interface device 112 is placed in a low power mode 506, the network interface device 112 may be configured to receive communications, e.g., inbound packets. These notifications may be pre-registered such that particular notifications cause the network interface device 112 to wake from a network quiet mode and communicate with the operating system 116, such as to indicate a particular endpoint that originated the communication. A variety of other types of pre-registrations are also contemplated, such as a specific four tuple pattern contained in the data as described in relation to the implementation example.

Figure 12:
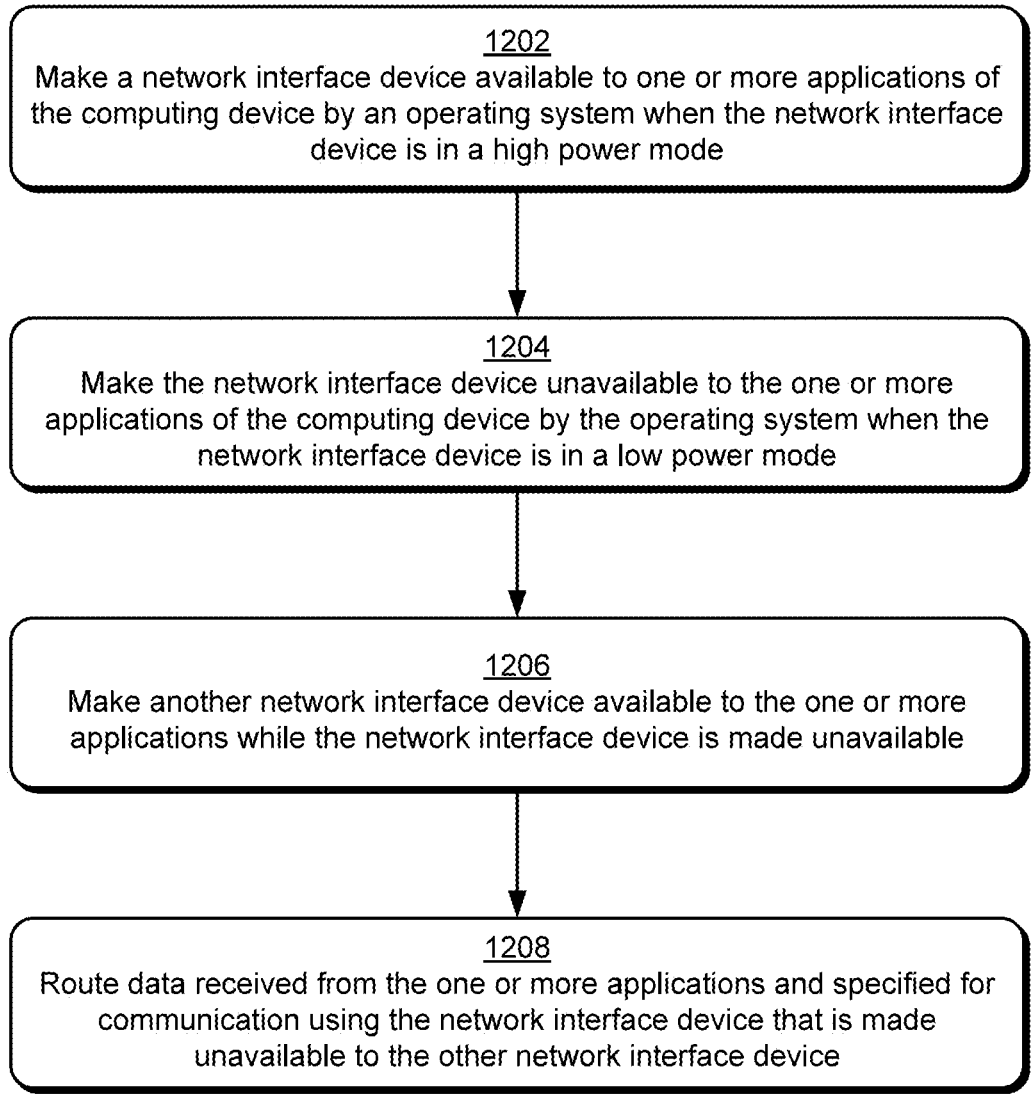
FIG. 12 is a flow diagram depicting a procedure in an example implementation in which a network interface device is made unavailable to applications during a lower power mode.

FIG. 12 depicts a procedure 1200 in an example implementation in which a network interface device is made unavailable to applications during a lower power mode. Aspects of the procedure may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment of FIG. 1 and the systems and example implementations of FIGS. 5-10.

A network interface device is made available to one or more applications of a computing device by an operating system when the network interface device is in a high power mode (block 1202). The network device manager module 112, for instance, may expose the network interface 112 as available for communication using the network 114 to send and receive data.

The network interface device is made unavailable to one or more applications of a computing device by an operating system when the network interface device is in a low power mode (block 1204). The network device manager module 126, for instance, may enforce a network quiet mode to reduce power consumption, such as in response to a determination that network traffic involved by the applications 118, 120 has completed. This quiet mode may have a defined amount of time, may be exited in response to an event, and so on. This unavailability may include use of the "black hole" techniques described earlier such that the applications 118, 120 are not permitted to "wake" the network interface device 112 during this time.

Another network interface device is made available to the one or more applications while the network interface device is made unavailable (block 1206). As previously described the computing device 102 may include a plurality of network interfaces devices. Accordingly, the network device manager module 126 may manage which of the devices are placed in high or low power modes to conserve resources of the computing device, such as to make a single one of the network interface devices 112 available for an Internet connection.

The network device manager module 126, for instance, may employ routing techniques to prevent inadvertent waking of a "wrong" network interface device 112. Continuing with the previous example, data received from the one or more applications that is specified for communication using the network interface device that is made unavailable is routed to the other network interface device (block 1208). This may be used, for instance, to route data intended by an application 118 for communication using a cellular network interface device that is inactive to be routed automatically to an active network interface device, such as a Wi-Fi device.

Thus, an operating system may be configured to support a technique to restrict access by one or more applications of the computing device to a network interface device that is placed in a mode to reduce power consumption. Further, the network interface device configured to wake from the mode in response to receipt of a notification, such as a push notification from a particular endpoint. Additional discussion of maintenance of network connections may be found in relation to the following section.

Keep Alive Manager Module

Figure 13:
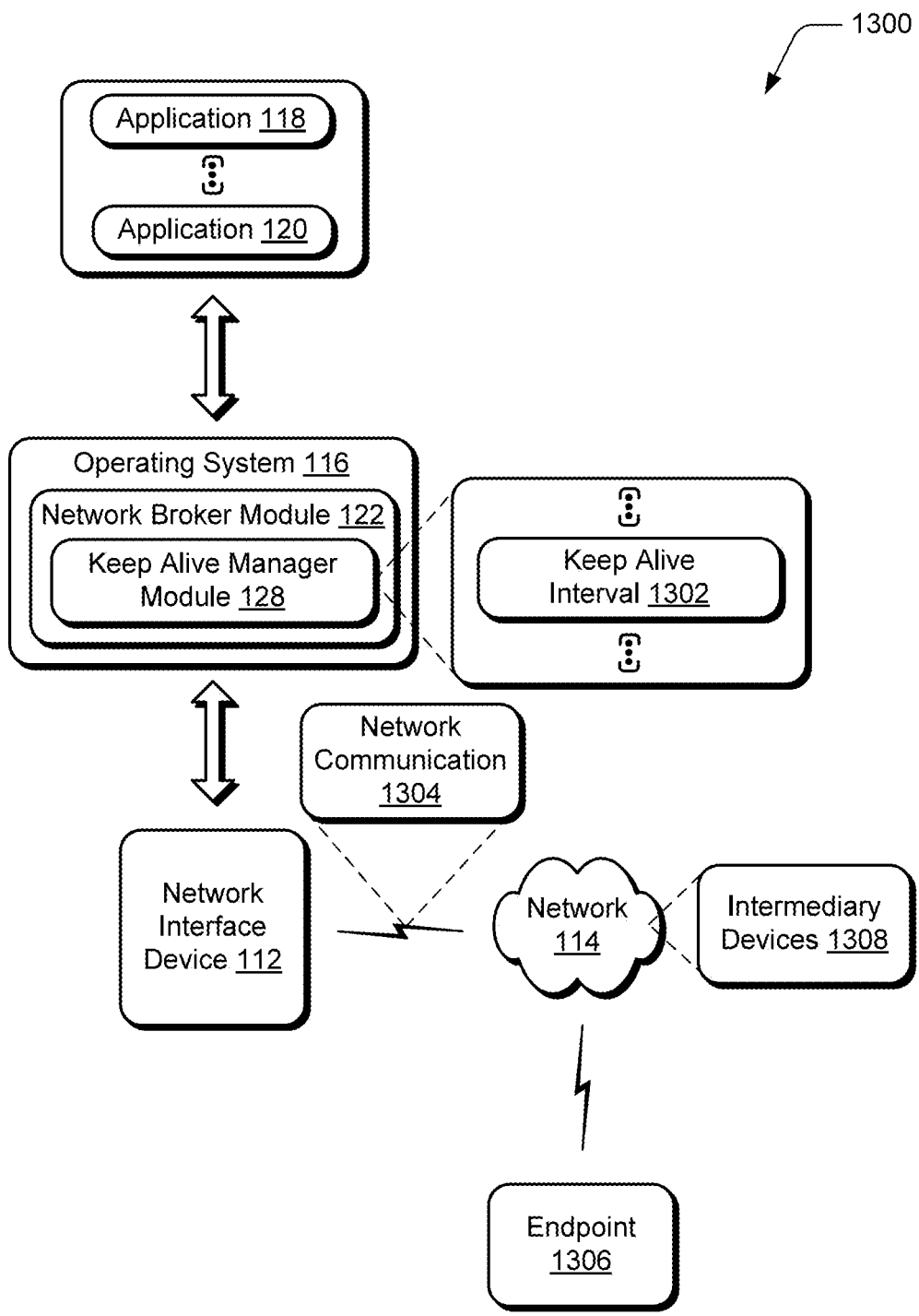
FIG. 13 is an illustration of a system in an example implementation showing the network broker module of FIG. 1 in greater detail as employing a keep alive manager module.

FIG. 13 is an illustration of a system 1300 in an example implementation showing example operation of a keep alive manager module 128 of the network broker module 122 of FIG. 1. The keep alive manager module 128 is representative of functionality of the network broker module 122 to maintain notification channels over a network 114. For example, the keep alive manager module 128 may be utilized to calculate a keep alive interval 1302 that defines an interval between network communications 1304 that is sufficient to keep a notification channel open between the applications 118, 120 and an endpoint 1306, e.g., a server of a network service. Thus, the keep alive interval 1302 may be calculated to describe a frequency of communication to maintain state of communication via the network 114, e.g., via one or more notification channels.

The network broker module 112 may manage a variety of different notification channels. Application 118, for instance, may be configured to support email communication and therefore interact with an email service endpoint. The application 118 may also be configured to support instant messaging and therefore may communication with another endpoint (e.g., a server of an instant messaging service). Thus, a single application 118 may support a plurality of notification channels. Additionally, the applications 118, 120 may also communicate with a same endpoint using different notification channels. Thus, the keep alive manager module 128 may address a variety of different notification channels that involve communication via the network 114.

Additionally, the keep alive manager module 128 may calculate the keep alive interval 1302 in a variety of ways. In one such implementation, the keep alive interval 1302 may be calculated based on server timeout interval of an endpoint 1306 with which the application 118 is to communicate, e.g., via a notification channel. For example, the server timeout interval may be determined by the keep alive manager module 128 based on a known timeout specified by an application that is configured to interact with the endpoint 1306.

Application 118, for instance, may be configured to interact with a specific endpoint, such as a social network service. This application may therefore be coded with "knowledge" of the server timeout interval of that timeout such that the application 118 may be configured to maintain a notification channel with that endpoint, e.g., cause a communication to be sent to maintain state with the endpoint 1306. Therefore, in this example the keep alive manager module 128 may determine this interval from the application 118 itself. Other examples are also contemplated, such as to determine the server timeout interval of the endpoint 1306 a priori, may be based on monitored interaction between the computing device and the endpoint 1306 (e.g., by detecting failures and readjusting), and so forth.

In another such implementation, the keep alive interval 1302 may be calculated using a network timeout interval to address intermediary devices 1308 of the network 114. For example, a network connection between the network interface device and the endpoint 1306 may involve a variety of intermediary devices 1308, such as a network address translation device, a proxy, firewall, wireless access point, and so on. The network timeout interval may be determined by the keep alive manager module 128 in a variety of ways.

For example, the keep alive manager module 128 may connect via the network 114 and corresponding intermediary devices 1308 with an endpoint that has a "known" or "known-to-be-long" server timeout interval, such as a test device made available for such a determination. The keep alive manager module 128 may then monitor a connection with this known endpoint to determine when the intermediary devices 1308 have "timed out" and therefore determine the network timeout interval of the intermediary devices 1308. This network timeout interval may be saved by the keep alive manager module 128 for use in calculating the keep alive interval 1302. For instance, this network timeout interval may be saved as specific for a particular network via which the network interface device 112 accesses the network 114.

In one or more implementations, the keep alive interval 1302 may be calculated based on the server timeout interval of the endpoint 1306, the network timeout interval of intermediary devices 1308, and even both intervals. The keep alive interval 1302, for example, may be calculated by the keep alive manager module 128 to efficiently utilize resources of the computing device 102 in maintaining the notification channels. For instance, the keep alive manager module 128 may determine that the network timeout interval is 15 seconds and the server timeout interval is 20 seconds. Therefore, the keep alive manager module 128 may wake the network interface device 112 at fifteen second intervals to communicate with the endpoint 1306 and thus keep the endpoint 1306 and the intermediary devices 1308 active. Thus, in this instance the keep alive manager module 128 may avoid waking the network interface device 112 at both fifteen and twenty second intervals yet enable both devices to maintain state.

Thus, a single network timeout value may be calculated and a minimum of these values (e.g., a baseline floor) to compute a coalesced time that describes when concurrent "keep alives" are sent. Thus, the network timeout interval may apply to the plurality of server connections.

Additionally, one or more implementations may address network connection being lost. Networks may be inconsistent such that connections may be lost from time to time. When that occurs, the persistent connection to a server may be severed. Thus, these implementations may employ an ability to automatically detect when the network is available again. For example, on a Wi-Fi network this may be done in hardware or firmware in an efficient manner via a "network list offload," via an operating system itself, and so on. Thus, an operating system may notify this class of applications of the presence of the network via a callback routine, and these applications may then reestablish a connection, e.g., a long-lived connection to the push notification server. Therefore, a coalesced notification may be performed to allow the plurality of communication applications to reestablish connections, which may be used to optimize use of local computing resources as well as optimizing the use of the network interface device resource.

Techniques may also be used by the keep alive manager module 128 to address the applications 118, 120. For example, the keep alive manager module 128 may be configured to batch communications to be sent by the applications 118, 120 to maintain notification channels. Thus, like before the keep alive interval 1302 may be configured for efficient utilization of resources of the computing device 102, e.g., a power source 108.

For instance, the keep alive manager module 128 may determine that application 118 is configured to initiate a "keep alive" communication at ten second intervals and application 120 is configured to initiate a "keep alive" communication at eight second intervals. Therefore, the keep alive manager module 128 may wake the network interface device 112 at eight second intervals for both applications 118, 120 to perform the communications. In this way, the keep alive manager module 128 may coalesce application 118, 120 initiated "keep alives" for notification channels to various endpoints 1306 to save power and other resources. Thus, the keep alive manager module 128 may base the keep alive interval 1302 on a variety of factors and may also adjust the keep alive interval 1302, further discussion of which may be found in relation to the following figure.

Figure 14:
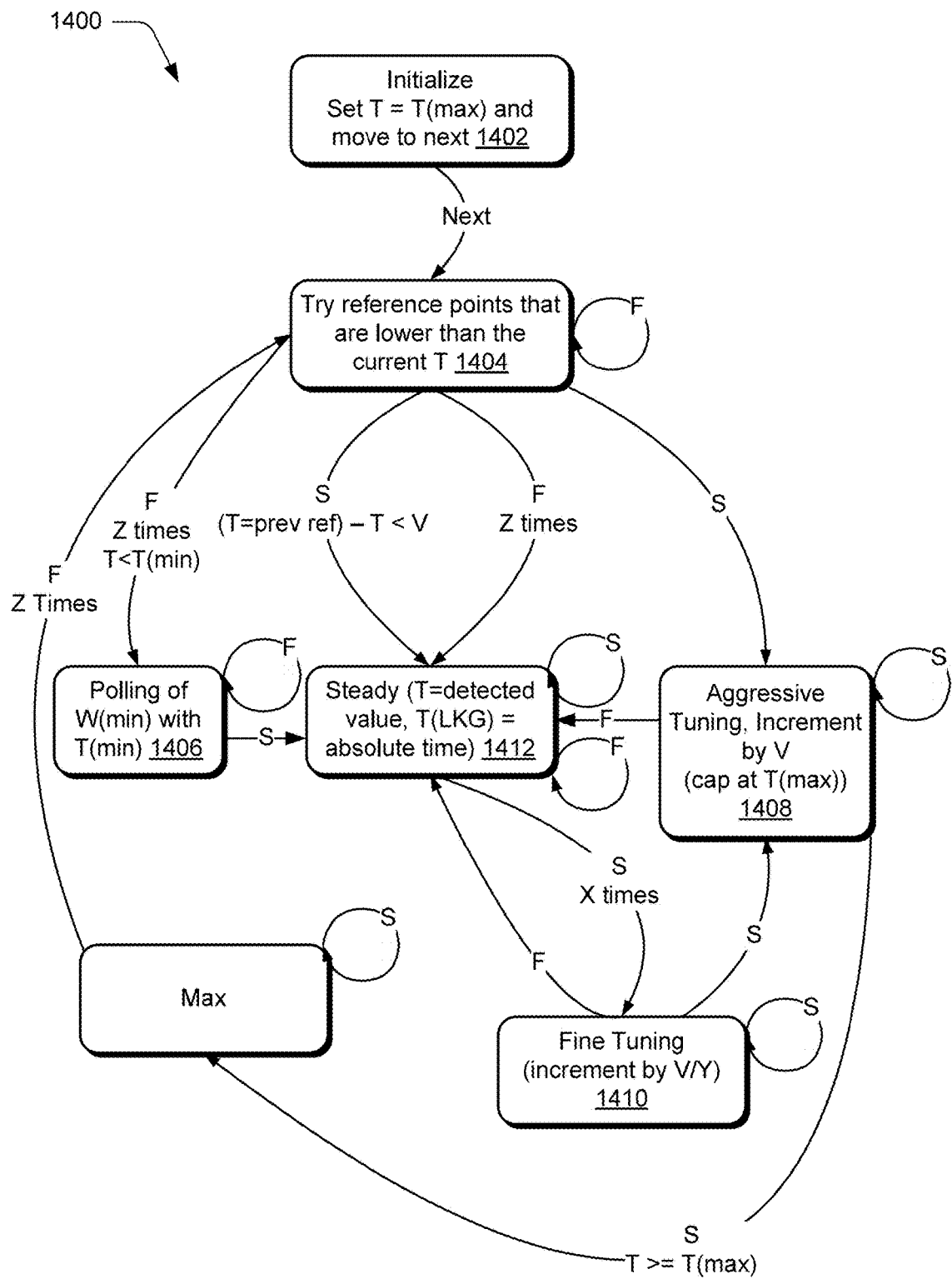
FIG. 14 is an illustration of a system in an example implementation showing an example implementation of calculating and adjusting a keep alive interval of FIG. 13.

FIG. 14 is an illustration of a system 1400 in an example implementation showing an example implementation of calculating and adjusting a keep alive interval of FIG. 13. As previously described, maintenance of a notification channel through intermediate network devices may be an issue of applications 118, 120 that access a network 114. Traditional techniques involved a hardcoded value that defined an interval to send/receive packets to preserve state. However, techniques are described herein in which a dynamic keep alive interval is calculated, e.g., using a test connection to a given remote destination, through examination of applications 118, 120 on the computing device 102 itself, through use of network and server timeout intervals, and so on.

The system 1400 of FIG. 14 illustrates an example of adjusting a keep alive interval 1302 of FIG. 13. In this example, an initial calculated keep alive interval is set at an initialize stage as T=T(max) (block 1402). Reference points are then tried that are lower than the current T (block 1404). This may involve polling of W(min) with T(min) in which W represents the reconnect time between polling (block 1406). This may also involve aggressive tuning in which T is incremented by V and capped at T(max) (block 1408), where V represents an increment of the aggressive tuning. The system 1400 may also involve fine tuning in which the value is incremented by V/Y, wherein Y represents the 1/Y of aggressive increment. These values may be leveraged to determine a steady state in which T—detected value and T(LKG) is absolute time. In the diagram, Z represents a number of retries performed, which may be set to address network errors and X represents of number of successful keep alives (KAs). Further discussion of operation of the keep alive manager module 128 may be found in relation to the following procedures.

Figure 15:
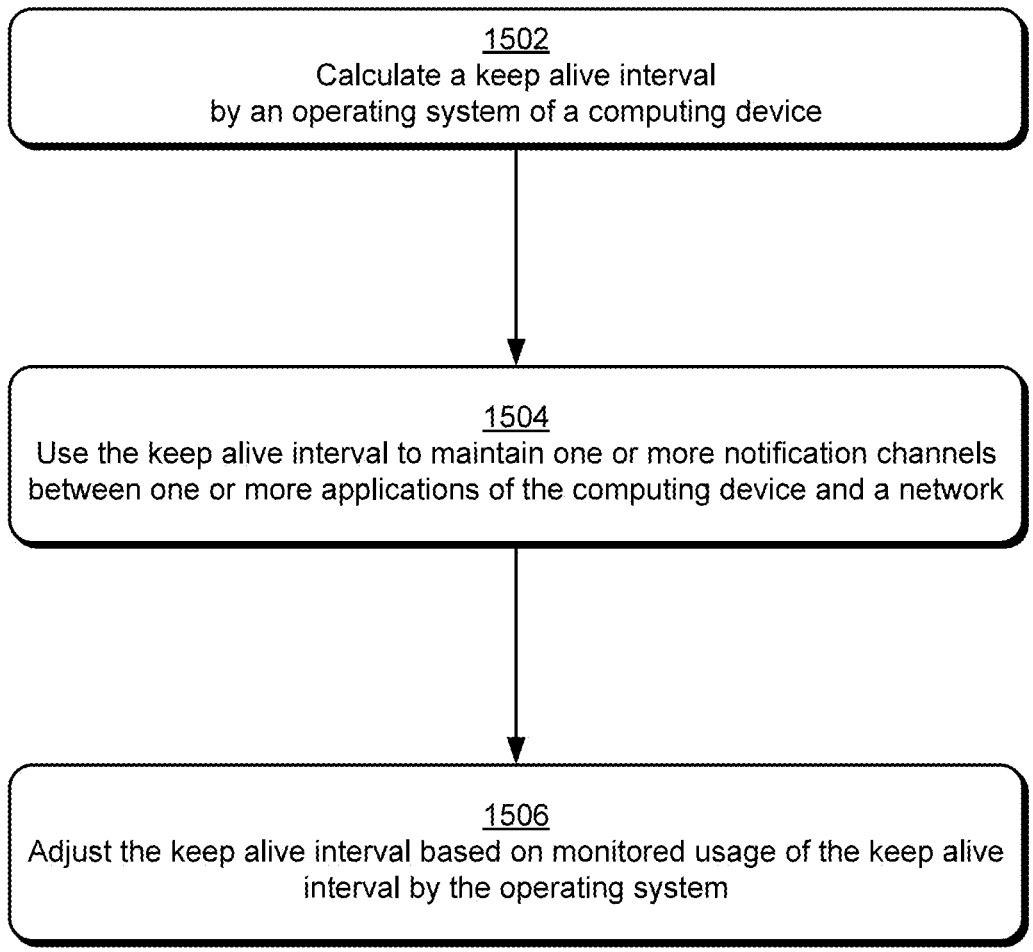
FIG. 15 depicts a procedure in an example implementation in which a keep alive interval is calculated and used to maintain one or more notification channels.

FIG. 15 depicts a procedure 1500 in an example implementation in which a keep alive interval is calculated and used to maintain one or more notification channels. Aspects of the procedure may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment of FIG. 1 and the systems and example implementations of FIGS. 13-14.

A keep alive interval is calculated by an operating system of a computing device (block 1502). As described in relation to FIGS. 13 and 14, the keep alive interval may be calculated in a variety of ways, such as based on a network timeout interval, server timeout interval, based on keep alive communication scheduling for a plurality of applications 118, 120, and so on.

The keep alive interval is used to maintain one or more notification channels between one or more applications of the computing device and a network (block 1504). The keep alive manager module 128, for instance, may monitor network communication to send and receive data via notification channels. If one or more of the notification channels reaches a keep alive interval without involving network communication 1304, the keep alive manager module 128 may maintain the channel by communicating with a respective endpoint 1306.

The keep alive interval may also be adjusted based on monitored usage of the keep alive interval by the operating system (block 1506). For example, the keep alive manager module 128 may determine that a notification channel has ceased to function due to reaching a network or service timeout interval. The keep alive manager module 128 may then adjust the keep alive interval 1302 "downward," (e.g., lessen an amount of time defined by the interval) to an amount of time that is less than the observed amount of time in which the channel timed out. Naturally, other examples are also contemplated, such as to increase the keep alive interval 1302 as described in relation to FIG. 14.

FIG. 16 depicts a procedure 1600 in an example implementation in which a keep alive interval is calculated to batch keep alive communications from applications. Aspects of the procedure may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment of FIG. 1 and the systems and example implementations of FIGS. 13-14.

A determination is made for each of a plurality of applications executable on a computing device of one or more server timeout intervals specified to maintain a notification channel with a respective endpoint via a network (block 1602). The keep alive manager module 128, for instance, may examine applications 118, 120 to determine a server timeout interval to be used by the respective applications to maintain notification channels with respective endpoints.

A keep alive interval is calculated from the one or more server timeout intervals for each of the plurality of applications (block 1604). As described in relation to FIG. 13, the keep alive manager module 128, may determine the keep alive interval 1302 based on efficiency of resource usage for the different server timeout intervals. The keep alive interval may then be used to wake a network interface device as specified to maintain the notification channels (block 1606). For example, the keep alive manager module 128 may determine that network communication 1304 has not occurred for either of the communication channels while the network interface device 112 is in a low power mode. Accordingly, the keep alive manager module 128 may wake the network interface device 112 to communicate with the respective endpoints 1306 at the keep alive interval 1302 to efficiency utilize the resources of the computing device 102. A variety of other examples are also contemplated as described above and as further described in relation to the following implementation example.

Implementation Example

Figure 17:
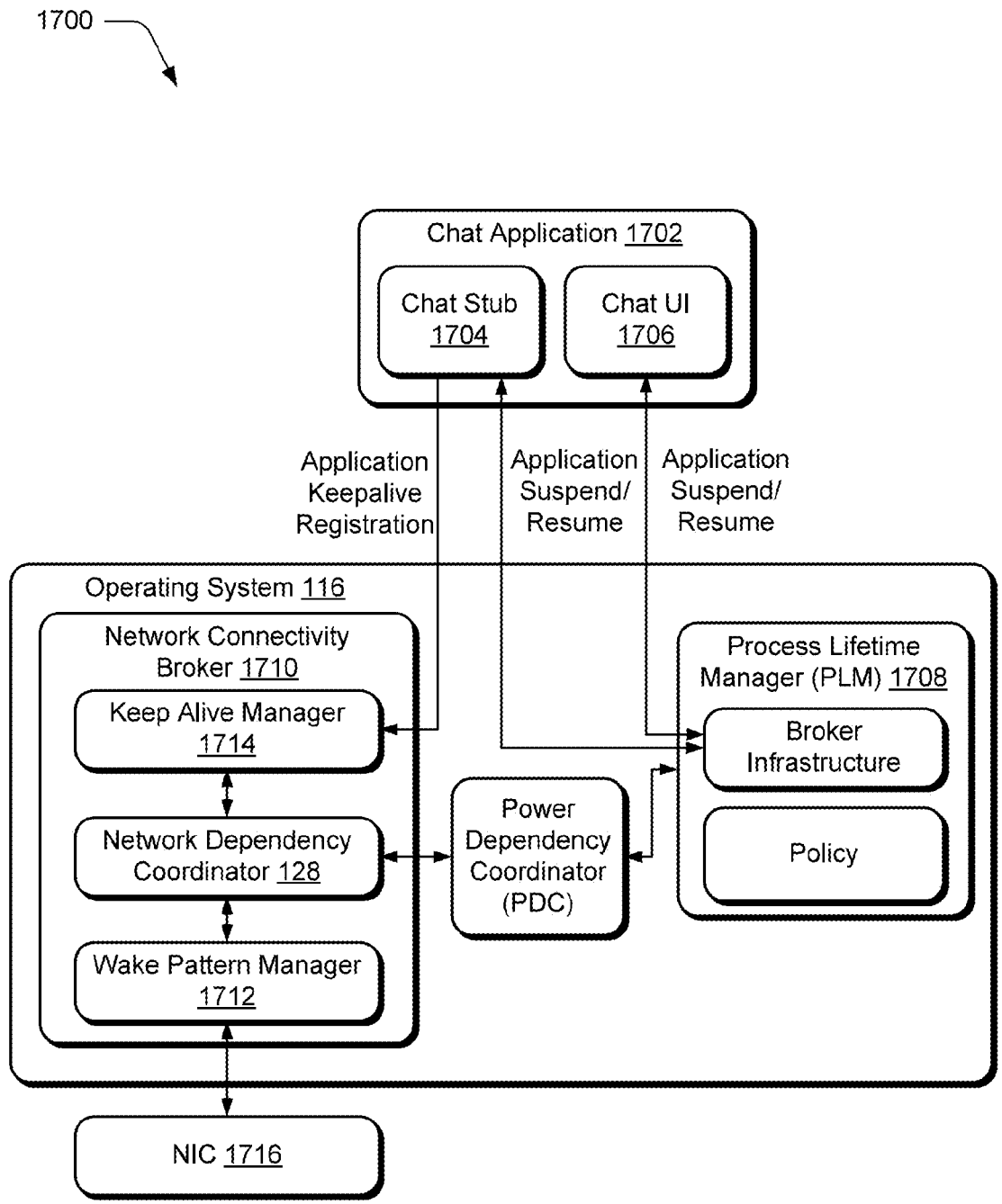
FIGS. 17 and 18 depict systems showing implementation examples of a network connectivity broker of FIG. 1.
Figure 18:
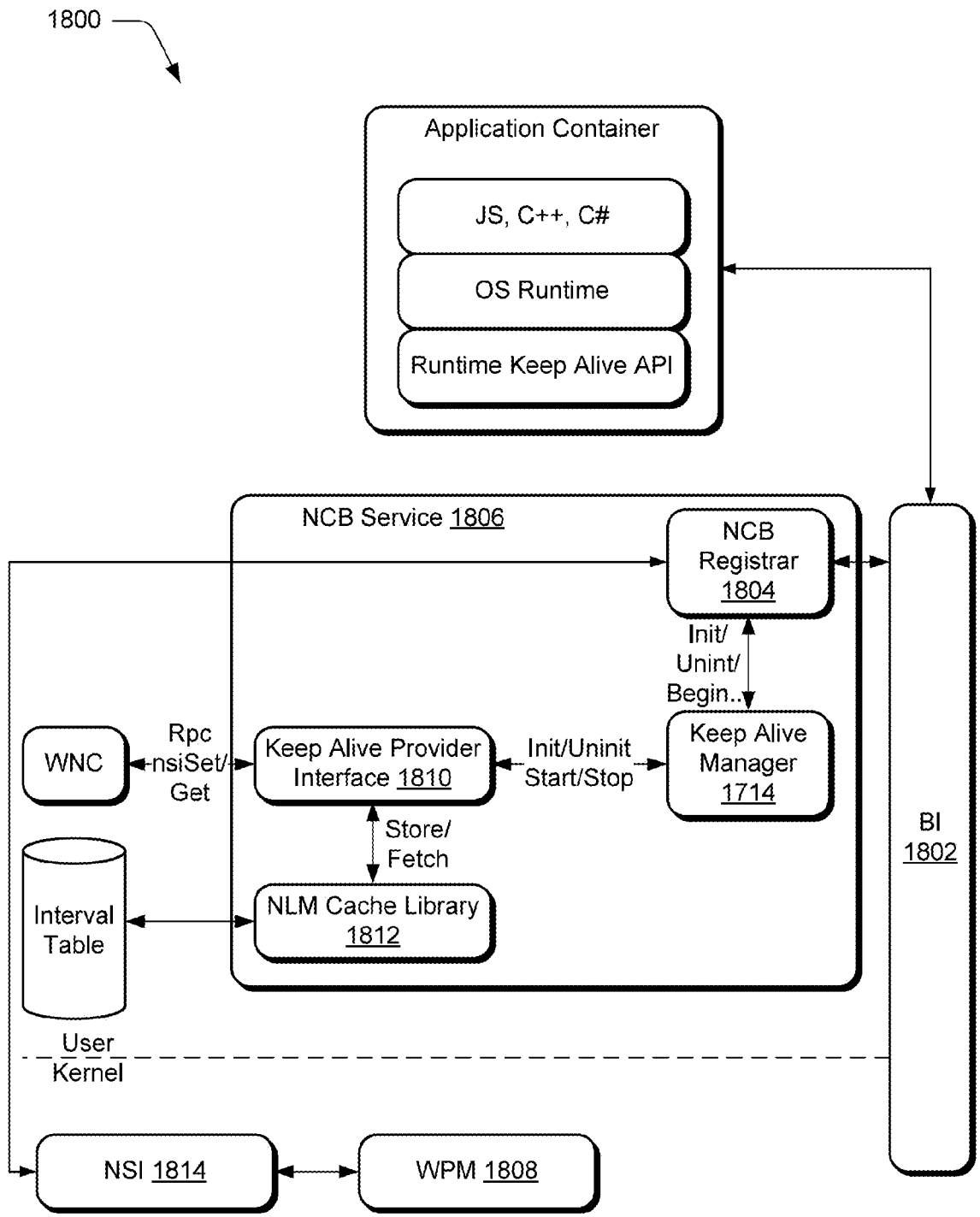

FIGS. 17 and 18 depict systems 1700, 1800 showing implementation examples of the network connectivity broker 122 of FIG. 1. As previously described in relation to FIG. 1, support of a system state called "connected standby" in system-on-chip based devices may provide an opportunity for enabling an "Always On, Always Connected" (AOAC) user experience. For example, an application may be suspended when not "in focus," e.g., not in foreground. As a result, a network 114 and network interface devices 112 may enter a "network quiet mode" (netqm). In this mode, the operating system 116 may prevent outgoing packets from the device, while ensuring that L2 connectivity and L3 identity are maintained. An indication from a component referred to as a power dependency coordinator (PDC) to exit the quiet mode. Upon completion of tasks that involve network 114 connects, the network broker module 122 may cause the network interface device 112 to again enter a network quiet mode and remain in this state until PDC indicates an exit event.

An overview of a system 1700 that incorporates this design is shown in FIG. 17. The figure shows a chat application (e.g., configured for chat via the network 114) that includes a lightweight chat stub 1704, which is configured to handle connections and other bookkeeping for the chat application 1702. The chap application 1702 also includes a relatively "heavyweight" chat UI 1706 portion of the application 1702 is separated from the lightweight connection stub represented by the chat stub 1704. This is one of a variety of techniques that may be used to vector functionality of the application 1702.

A process lifetime manager 1708 is also illustrated as representing functionality to manage a lifecycle of the application 1702. In other words, when the application 1702 is tasked away from the user focus (e.g., moved to background), the PLM 1708 may terminate the chat UI 1706 process and suspend the chat stub 1704 in memory.

The system 1700 may leverage a kernel broker infrastructure that includes a mechanism to rehydrate the chat stub 1704 when an interesting event occurs for the application 1702 as described previously. In this way, resources of the computing device may be conserved, e.g., a CPU of the computing device 102 may enter a quiet mode and stay in this mode until an incoming message triggers a wake, a kernel brokers wake the system for periodic activity, and so on.

The network connectivity broker (NCB) 1710 (which may or may not correspond to the network broker module 122 of FIG. 1) may employ a variety of functionality, which is represented as a wake pattern manager 1712 and a keep alive manger 1714. The wake pattern manager (WPM) 1712 is configured to ensure that the application 1702 can "rehydrate" upon a network event, e.g., wake upon a detection of a specific pattern.

The keep alive manager 1714 is configured to ensure that a notification channel is a maintained for the application 1702, e.g., for reachability from a cloud service for incoming push notifications. For example, the application 1702 may register a work item with the BI 1802 of FIG. 18 thereby indicating to the operating system 116 that the application 1702 is interested in keep alive activity. The operating system 116 may then determine an appropriate coalesced keep alive interval to wake applications 1702 that have registered a callback to indicate that outbound packet activity is permitted for a pre-defined amount of time, e.g., for a few seconds. The BI 1802 may "sandbox" work items in terms of CPU and memory resources. This allows the application 1702 to perform a periodic "keep alive" to a respective endpoint (e.g., service "in the cloud") to maintain reachability. This may also be used to limit an ability of the applications from inefficient use of resources due to an overabundance of "keep alives."

The operating system, in conjunction with a notification service (e.g., a Windows Notification Service) may be used determine a dynamic keep alive interval as previously described. The dynamic keep alive interval, for instance, may be implemented as an "exponential back-off" which doubles an amount of time defined by the interval starting conservatively at four minute interval and incrementing to a value that the connection is still maintained. The notification service may use a test connection for this purpose to determine the dynamic interval. In one or more implementations, the keep alive manager 1714 does not distinguish between the application state or the system to be in connected standby or Active/ON, although other implementations are also contemplated.

The wake pattern manager 1712 is representative of functionality to plumb an appropriate wake pattern for a network interface device, such as a network interface card (NIC) 1716. The wake pattern manager 1712 may cause the NIC 1716 to go into a "Wake on LAN" mode upon network quiet mode entry. The NIC 1716, for instance, may transition to a D3 mode in which the NIC 1716 is configured to accept and deliver an incoming packet if it matches a set of wake patterns. If so, the may cause the NIC 1716 to transition to an active state. Wake patterns may be derived from a variety of sources, such as "<SrcAddr, DstAddr, SrcPort, DstPort, TransportProtocol>" for each wake-enabled connection. In one or more implementations, the NIC 1716 passes the incoming packet that caused the wake up to the protocol stack (as opposed to discarding/dropping it) since the loss of such a packet may impact the real-time responsiveness for applications that support features such as VoIP.

A Runtime API surface may also be exposed to applications that are configured to make use of the keep alive and remote wake functionality provided by the operating system 116. This library may be used to allow applications to perform a variety of functions, including:

Indicate creation of notification channels (e.g., BeginSetup);
Indicate the setup completion of notification channels (e.g., EndSetup);
Set desired keep alive interval in minutes (e.g., ServerKeepAliveIntervalTime);
Register Background Task handlers for keep alive events and remote wake events; and
Indicate to the system that the keep alive interval was not sufficient (e.g., DecreaseKeepAliveInterval).

Because a notification system may be implemented as an inbox component that is continually executing, a work item code to be executed for keep alive events may be triggered by an Activation Proxy method. The activation proxy may be hidden inside a runtime library and activated through a private API. A NCB service check may be used to check an integrity level of the process. The proxy creates WNF events and listens to a WNF channel for WNF event messages. The background task handler for notification service may be invoked by the proxy when BI (as a result of NCB service/TCPIP.sys calling BiSignalEvent) publishes a WNF event message.

A runtime API library may use LRPC to communicate with the NCB subservice (Ncbsvc.dll) hosted within the IP Helper service to provide a keep alive time to a NCB and receive the event names for keep alive and wake events. The runtime API may then call broker infrastructure APIs to associate application provided callbacks with broker infrastructure provided events.

The system 1800 of FIG. 18 includes an NCB registrar 1804, which is configured to isolate the actual communication interfaces used by an NCB service 1806 to speak to the rest of the operating system 116. For instance, the RPC used by the runtime APIs may be isolated in the NCB Registrar. The Registrar may open an RPC server endpoint and listen to applications. The applications may use the runtime library described above to connect to this RPC endpoint.

Similarly, actual BI 1802 API access may be hidden inside the NCB registrar 1804 as illustrated. This allows the keep alive manager 1714 to be isolated from architectural changes. The NCB registrar 1804 may call the BI 1802 APIs to create "keep alive" and "wake" events. The other part of the NCB registrar 1804 may involve communicating with a WPM 1808.

The keep alive provider interface 1810 is configured to allow a WINS to register as a keep alive interval provider, and may use LRPC for communicating with the WINS. The WINS may provide keep alive interval estimates using callbacks registered by the keep alive provider interface 1810.

The keep alive provider interface 1810 may cache the estimates on a per network (NLM ID) basis in an NLM cache library 1812. This NLM cache may be accessed through a library that may be common between the keep alive provider interface and a DA site manager.

The keep alive manager 1714 may be configured to request a keep alive interval estimate from a keep alive provider. A timer (that may be coalesced) may be created using a "SetThreadPoolTimer" API. The time may be set as the minimum of T_WINS and T_APP—the keep alive interval requested by the application.

When the keep alive timer expires, the keep alive manager 1714 may signal a keep alive event by calling the NCB registrar 1804. The NCB registrar 1804 may then call the BI 1802 APIs to trigger work items to be scheduled.

An application may provide the NCB with a hint that the interval provided was too long. This may be used along with the application ID and the notification channel ID to store in a cache again on a per network basis using the NLM cache library 1812 described previously.

A model for identifying notification channels may be based on a "Start/Done" model which delineates a process-wide time span during which each established TCP connection by a process (except loopback) is treated as a notification channel by NCB. A Start/Done time span, however, has a single set of parameters, collectively referred as one "NCContext", which apply to each of the connections created during that span. It should be noted that a one-to-one relationship between an NCContext and a TCP connection is typically encountered. However, the Start/Done model does not guarantee this relationship, hence this design may operate under an assumption that there can be multiple TCP connections that correspond to a single NCContext span. This span may be identified by a tuple that includes a process ID, an opaque NCContext ID created and used by the registrar, an optional opaque notification channel ID (passed to BI during event signaling, hence meaningful to the app), and an optional remote-wake brokered event.

The NCB registrar 1804 may be configured to indicate the Start(PID, NCContextID, AppNCID, BrokeredEvent) and Done( ) (e.g., setting and clearing an NCContext) to WPM. The NCB registrar 1804 may also ensure that the actual application process PID remains intact (e.g., is not recycled) during the Start/Done time span. The NCB registrar 1804 may achieve this by using an RPC API that takes a reference on the client process.

The NCB may indicate the Start and Done to WPM 1808 via NSI 1814. WPM may expose a INET NSI object (which may be similar to a port reservation NSI object) for this purpose. NCB may use NSI set commands for setting the active NCContext (e.g., Start) and clearing the active NCContext (e.g., Done). In one or more implementations, there is a single active NCContext for a given process at a given point in time.

TCP connections established by a given process may inherit the current active NCContext (if any) for that process. Once an NCContext is inherited, it may remain attached to the inheriting TCP connection. If the NCB sets a new active NCContext for a process (e.g., after clearing the previous active one), new connections may inherit the new NCContext, and connections that have inherited the previous NCContext may remain unaffected. An inherited NCContext (by one or more TCP connections) may be cleared by the NCB service 1806 by also using NSI 1814. If an NCContext is cleared, WPM 1808 may stop signaling the associated remote-wake brokered event (but the plumbed wake pattern remains intact until the connection is closed).

Since WPM 1808 may keep track of some per process state (e.g., active and inherited NCContexts) that is controlled by the NCB service 1806, it may rely on the NCB service 1806 to properly cleanup state (NCContexts) as applications exit. However, it is possible that the NCB service 1806 process may crash/exit abnormally. In order to perform proper cleanup, WPM 1808 may receive an indication of NCB service process exit by NCB creating a TCP socket (not bound or connected) and setting a private option on the socket to mark it as the NCB control socket. Since the object manager properly closes handles (which includes sockets) when a process exits, the socket handle closure causes TCP's endpoint close routine to be invoked. TCP may then cleanup each of the NCContexts upon closure of the NCB control socket.

As described previously, the wake pattern manager (WPM) 1808 (which may be implemented in a TCP module in tcpip.sys) may be configured to keep track of NCContexts. TCP may keep a table of processes and the associated NCContext(s) set by the NCB service 1806. In one or more implementations, there is either one or zero "active" NCContext for a given process and there can be one or more "inherited" NCContexts for a given process. TCP may be configured to allow a single system account under which NCB service runs to set/clear NCContexts.

In one or more implementations, an NCContext has one reference count for being "active" and one reference count for each inheriting connection. That is, the NCContext can be deleted when it is neither active nor was inherited by connections.

When a connection inherits an NCContext, WPM 1808 may plumb down a wake pattern made up from a connection's 4-tuple down to the network interface device via NSI 1814 methods for wake-pattern plumbing if the NIC supports wake patterns. WPM 1808 may keep track of whether a wake pattern was not successfully plumbed for a given connection for each active NCContext. Before the active NCContext is cleared by the NCB service during the "Done" call, NCB service 1806 may issue an NSI get for that NCContext to query this wake pattern plumbing status and return the information to the application (e.g., whether the system failed to plumb a wake pattern for a connection associated with that NCContext).

For each TCP connection which has inherited an NCContext with a brokered remote-wake event, TCP may signal the brokered remote-wake event whenever a data indication (e.g., upcall or receive completion) is made by TCP on that connection due to incoming data. Once TCP signals the remote wake event, it may disable (e.g., disarm) further signaling on that NCContext until the remote-wake event is rearmed by the NCB service 1806. NCB service 1806 rearms the remote wake-event after the application's remote-wake callback returns control back to the NCB routine which invoked the callback.

SIO_ADDRESS_LIST_SORT ioctl handling in NL may also be changed to be aware of whether the Ioctl is being issued by a process while there is an active NCContext for that process, and if yes, the sort logic may prefer the addresses over native interfaces to tunnel interfaces.

WPM 1808 may also keep a timer for tracking the remaining valid lifetimes for IPv6 addresses formed by using an IPv6 subnet prefix advertised by a router. Since router advertisements may be dropped by the NICs in a wake-able low-power state, the IPv6 prefix timeout may be refreshed via explicit router solicitation before the timeout happens, otherwise L3 identity may not be preserved reliably in some instances. The WPM 1808 may use the NDIS API to take a "NIC active reference" on the network interface on which router solicitation may take place in order to ensure that the NIC "stays up" (e.g., does not go into D3 due to not having any NIC-active reference held by anyone in the system).

Example System and Device

Figure 19:
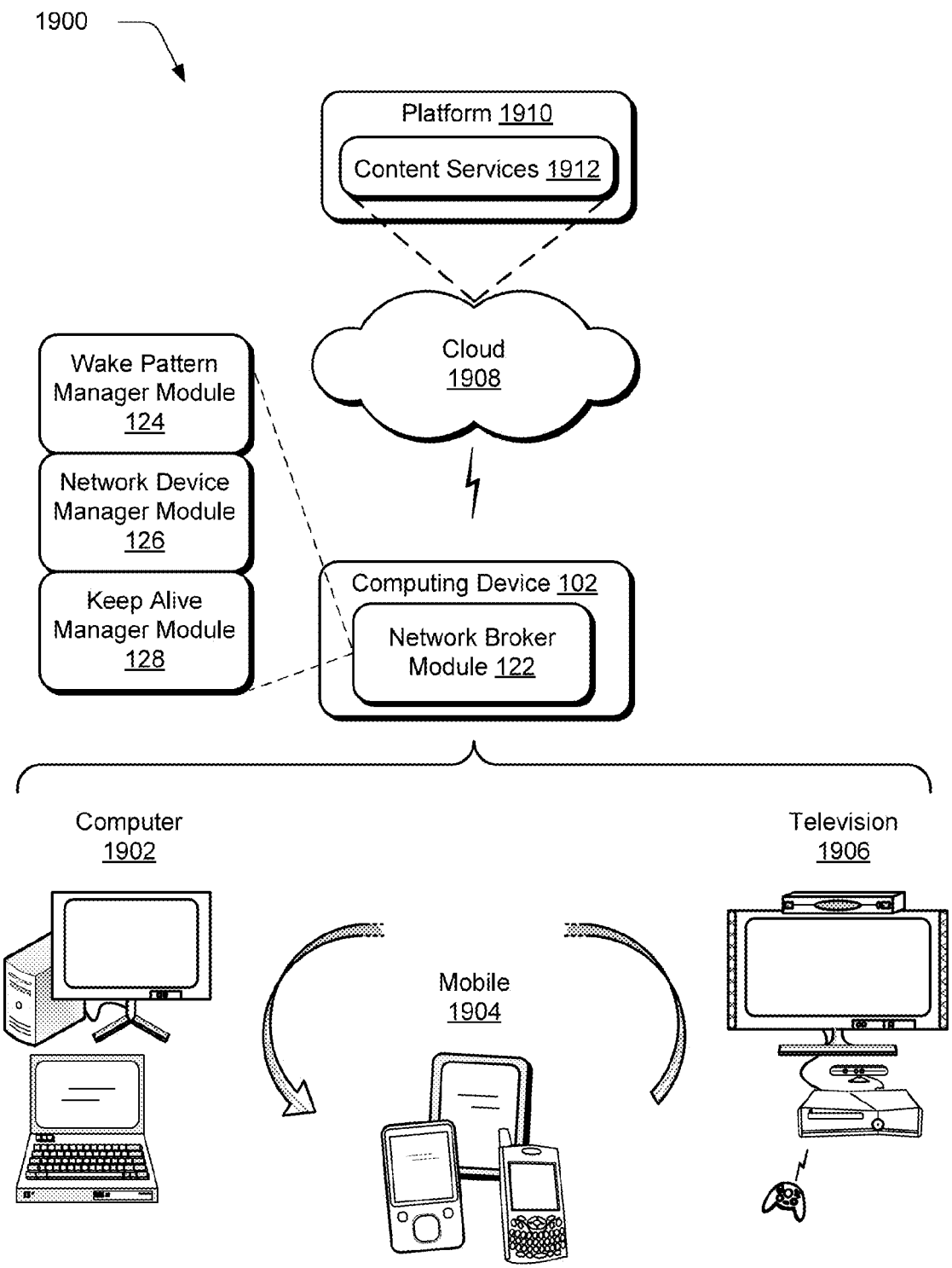
FIG. 19 illustrates an example system that includes the computing device as described with reference to FIG. 1.

FIG. 19 illustrates an example system 1900 that includes the computing device 102 as described with reference to FIG. 1. The example system 1900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 1902, mobile 1904, and television 1906 uses. Each of these configurations includes devices that may have generally different constructs and capabilities, and thus the computing device 102 may be configured according to one or more of the different device classes. For instance, the computing device 102 may be implemented as the computer 1902 class of a device that includes a personal computer, desktop computer, a multi-screen computer, laptop computer, netbook, and so on.

The computing device 102 may also be implemented as the mobile 1904 class of device that includes mobile devices, such as a mobile phone, portable music player, portable gaming device, a tablet computer, a multi-screen computer, and so on. The computing device 102 may also be implemented as the television 1906 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein. This is illustrated through use inclusion of the network broker module 122, wake pattern manager module 124, network device manager module 126, and keep alive manager module 128 on the computing device 102. All or part of this functionality may also be distributed "over the cloud" as described below.

The cloud 1908 includes and/or is representative of a platform 1910 for content services 1912. The platform 1910 abstracts underlying functionality of hardware (e.g., servers) and software resources of the cloud 1908. The content services 1912 may include applications and/or data that can be utilized while computer processing is executed on servers that are remote from the computing device 102. Content services 1912 can be provided as a service over the Internet and/or through a subscriber network, such as a cellular or Wi-Fi network.

The platform 1910 may abstract resources and functions to connect the computing device 102 with other computing devices. The platform 1910 may also serve to abstract scaling of resources to provide a corresponding level of scale to encountered demand for the content services 1912 that are implemented via the platform 1910. Accordingly, in an interconnected device embodiment, implementation of functionality of the functionality described herein may be distributed throughout the system 1900. For example, the functionality may be implemented in part on the computing device 102 as well as via the platform 1910 that abstracts the functionality of the cloud 1908.

Figure 20:
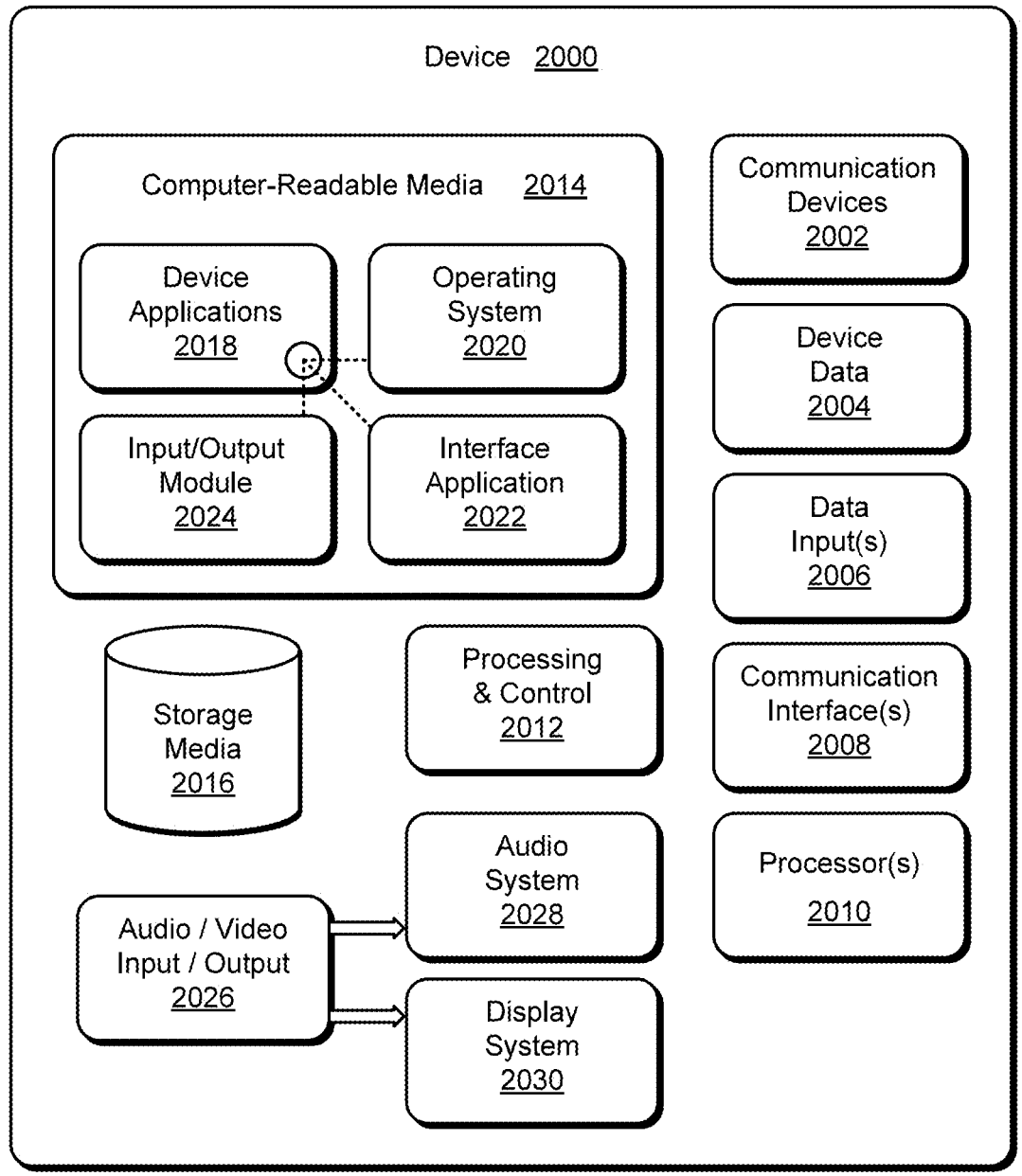
FIG. 20 illustrates various components of an example device that can be implemented as any type of computing device as described with reference to FIGS. 1, 2, 5-10, 13, 14, and 17-19 to implement embodiments of the techniques described herein.

FIG. 20 illustrates various components of an example device 2000 that can be implemented as any type of computing device as described with reference to FIGS. 1 and 19 to implement embodiments of the techniques described herein. Device 2000 includes communication devices 2002 that enable wired and/or wireless communication of device data 2004 (e.g., received data, data that is being received, data scheduled for broadcast, data packets of the data, etc.). The device data 2004 or other device content can include configuration settings of the device, media content stored on the device, and/or information associated with a user of the device. Media content stored on device 2000 can include any type of audio, video, and/or image data. Device 2000 includes one or more data inputs 2006 via which any type of data, media content, and/or inputs can be received, such as user-selectable inputs, messages, music, television media content, recorded video content, and any other type of audio, video, and/or image data received from any content and/or data source.

Device 2000 also includes communication interfaces 2008 that can be implemented as any one or more of a serial and/or parallel interface, a wireless interface, any type of network interface, a modem, and as any other type of communication interface. The communication interfaces 2008 provide a connection and/or communication links between device 2000 and a communication network by which other electronic, computing, and communication devices communicate data with device 2000.

Device 2000 includes one or more processors 2010 (e.g., any of microprocessors, controllers, and the like) which process various computer-executable instructions to control the operation of device 2000 and to implement embodiments of the techniques described herein. Alternatively or in addition, device 2000 can be implemented with any one or combination of hardware, firmware, or fixed logic circuitry that is implemented in connection with processing and control circuits which are generally identified at 2012. Although not shown, device 2000 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 2000 also includes computer-readable media 2014, such as one or more memory components, examples of which include random access memory (RAM), non volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 2000 can also include a mass storage media device 2016.

Computer-readable media 2014 provides data storage mechanisms to store the device data 2004, as well as various device applications 2018 and any other types of information and/or data related to operational aspects of device 2000. For example, an operating system 2020 can be maintained as a computer application with the computer-readable media 2014 and executed on processors 2010. The device applications 2018 can include a device manager (e.g., a control application, software application, signal processing and control module, code that is native to a particular device, a hardware abstraction layer for a particular device, etc.). The device applications 2018 also include any system components or modules to implement embodiments of the techniques described herein. In this example, the device applications 2018 include an interface application 2022 and an input/output module 2024 that are shown as software modules and/or computer applications. The input/output module 2024 is representative of software that is used to provide an interface with a device configured to capture inputs, such as a touchscreen, track pad, camera, microphone, and so on. Alternatively or in addition, the interface application 2022 and the input/output module 2024 can be implemented as hardware, software, firmware, or any combination thereof. Additionally, the input/output module 2024 may be configured to support multiple input devices, such as separate devices to capture visual and audio inputs, respectively.

Device 2000 also includes an audio and/or video input-output system 2026 that provides audio data to an audio system 2028 and/or provides video data to a display system 2030. The audio system 2028 and/or the display system 2030 can include any devices that process, display, and/or otherwise render audio, video, and image data. Video signals and audio signals can be communicated from device 2000 to an audio device and/or to a display device via an RF (radio frequency) link, S-video link, composite video link, component video link, DVI (digital video interface), analog audio connection, or other similar communication link. In an embodiment, the audio system 2028 and/or the display system 2030 are implemented as external components to device 2000. Alternatively, the audio system 2028 and/or the display system 2030 are implemented as integrated components of example device 2000.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computing system comprising:
one or more processor; and
one or more storage device having stored computer-executable instructions which are executable by the one or more processors to implement a method for managing network interface devices, the method including:
exposing a first network interface device as available for communications using a network to one or more applications in response to the first network interface device being in a high power mode;
determine the first network interface device is transitioned to a low power mode;
enforcing a quiet mode for the first network interface device, in response to the first network interface device being transitioned to the low power mode, to help reduce power consumption and by at least refraining from exposing the first network interface device as available for communications using the network and by preventing at least one network packet addressed to the first network interface device from waking the first network interface device during the quiet mode;
exposing a second network interface device as available for the communications while the first network interface device is in the low power mode during the quiet mode; and
rerouting the at least one network packet addressed to the first network device that is received during the quiet mode and such that the at least one network packet is routed to the second network interface during the quiet mode.

2. The computing system of claim 1, wherein the method further includes transitioning out of the quiet mode and transitioning the first network device from the low power mode to the high power mode after a predetermined period of time elapsing within the quiet mode.

3. The computing system of claim 1, wherein the method further includes transitioning out of the quiet mode and transitioning the first network device from the low power mode to the high power mode in response to a predetermined event other than a passage of time.

4. The computing system of claim 1, wherein the method further includes transitioning the first network interface device from the high power mode to the lower power mode as part of a power conservation process, while preserving the second network interface device in the high power mode for facilitating an Internet connection.

5. The computing system of claim 1, wherein the first network interface device is a Wi-Fi device.

6. The computing system of claim 5, wherein the second network interface device is a cellular device.

7. The computing system of claim 1, wherein the first and the second network interface devices are different types of devices.

8. A computer program product comprising one or more storage device having stored computer-executable instructions which are executable by one or more processors of a computing system to implement a method for managing network interface devices, the method including:
- exposing a first network interface device as available for communications using a network to one or more applications in response to the first network interface device being in a high power mode;
- determine the first network interface device is transitioned to a low power mode;
- enforcing a quiet mode for the first network interface device, in response to the first network interface device being transitioned to the low power mode, to help reduce power consumption and by at least refraining from exposing the first network interface device as available for communications using the network and by preventing at least one network packet addressed to the first network interface device from waking the first network interface device during the quiet mode;
- exposing a second network interface device as available for the communications while the first network interface device is in the low power mode during the quiet mode; and
- rerouting the at least one network packet addressed to the first network device that is received during the quiet mode and such that the at least one network packet is routed to the second network interface during the quiet mode.

9. The computer program product of claim 8, wherein the method further includes transitioning out of the quiet mode and transitioning the first network device from the low power mode to the high power mode after a predetermined period of time elapsing within the quiet mode.

10. The computer program product of claim 8, wherein the method further includes transitioning out of the quiet mode and transitioning the first network device from the low power mode to the high power mode in response to a predetermined event other than a passage of time.

11. The computer program product of claim 8, wherein the method further includes transitioning the first network interface device from the high power mode to the lower power mode as part of a power conservation process, while preserving the second network interface device in the high power mode for facilitating an Internet connection.

12. The computer program product of claim 8, wherein the first network interface device is a Wi-Fi device.

13. The computer program product of claim 12, wherein the second network interface device is a cellular device.

14. The computer program product of claim 8, wherein the first and the second network interface devices are different types of devices.

15. A computer-implemented method for managing network interface devices, the method including:
- exposing a first network interface device as available for communications using a network to one or more applications in response to the first network interface device being in a high power mode;
- determine the first network interface device is transitioned to a low power mode;
- enforce a quiet mode for the first network interface device, in response to the first network interface device being transitioned to the low power mode, to help reduce power consumption and by at least refraining from exposing the first network interface device as available for communications using the network and by preventing at least one network packet addressed to the first network interface device from waking the first network interface device during the quiet mode;
- exposing a second network interface device as available for the communications while the first network interface device is in the low power mode during the quiet mode; and
- rerouting the at least one network packet addressed to the first network device that is received during the quiet mode and such that the at least one network packet is routed to the second network interface during the quiet mode.

16. The method of claim 15, wherein the method further includes transitioning out of the quiet mode and transitioning the first network device from the low power mode to the high power mode in response to a predetermined event other than a passage of time.

17. The method of claim 15, wherein the method further includes transitioning the first network interface device from the high power mode to the lower power mode as part of a power conservation process, while preserving the second network interface device in the high power mode for facilitating an Internet connection.

18. The method of claim 15, wherein the first network interface device is a Wi-Fi device.

19. The method of claim 18, wherein the second network interface device is a cellular device.

20. The method of claim 15, wherein the first and the second network interface devices are different types of devices.

* * * * *